(12) United States Patent
Saggar et al.

(10) Patent No.: US 11,700,031 B1
(45) Date of Patent: Jul. 11, 2023

(54) HOPPING TECHNIQUES FOR SINGLE CARRIER WAVEFORMS

(71) Applicant: QUALCOMM Incorporated, San Diego, CA (US)

(72) Inventors: Hemant Saggar, Irvine, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/565,015

(22) Filed: Dec. 29, 2021

(51) Int. Cl.
*H04B 1/7136* (2011.01)
*H04B 7/06* (2006.01)
*H04B 1/715* (2011.01)

(52) U.S. Cl.
CPC ......... *H04B 1/7136* (2013.01); *H04B 7/0686* (2013.01); *H04B 2001/7154* (2013.01)

(58) Field of Classification Search
CPC ................ H04B 1/7136; H04B 7/0686; H04B 2001/7154
USPC .................................. 375/133–138, 141, 148
See application file for complete search history.

(56) References Cited

U.S. PATENT DOCUMENTS

| | | | |
|---|---|---|---|
| 11,075,693 B1* | 7/2021 | Regunathan | H04B 7/0695 |
| 2020/0196343 A1* | 6/2020 | Marinier | H04W 72/21 |
| 2020/0213161 A1* | 7/2020 | Zhang | H04W 24/10 |
| 2020/0313760 A1* | 10/2020 | Laws | H04B 7/18517 |
| 2022/0353694 A1* | 11/2022 | Ly | H04W 72/0446 |

\* cited by examiner

*Primary Examiner* — Don N Vo
(74) *Attorney, Agent, or Firm* — Qualcomm Incorporated

(57) ABSTRACT

Aspects described herein relate to scheduling, or configuring a node to schedule, a transmission in multiple time periods based on a hopping pattern, where the hopping pattern includes at least one of a beam hopping pattern, a precoder hopping pattern, or a time hopping pattern. The transmission can be transmitted or received in the multiple time periods based on the hopping pattern.

30 Claims, 24 Drawing Sheets

HOPPING TECHNIQUES FOR SINGLE CARRIER WAVEFORMS

BACKGROUND

Aspects of the present disclosure relate generally to wireless communication systems, and more particularly, to using single carrier waveforms in high frequency bands.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as 5G NR, a node, such as a user equipment (UE), can use a single carrier waveform to transmitting wireless communications, such as to transmit uplink communications to a base station, sidelink communications to another UE, etc. Communications using single carrier waveforms can use an entire bandwidth allocation over a period of time, such as an entire symbol.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method for wireless communication at a user equipment (UE) is provided that includes scheduling multiple transmissions in multiple time periods based on a beam hopping pattern, where the beam hopping pattern includes at least one of at least one transmission of the multiple transmissions is scheduled as including at least one transmission part and across the multiple time periods using a different beam for each of the multiple transmissions, or at least two transmissions of the multiple transmissions scheduled with a beam switching gap between the at least two transmissions that is less than a symbol in duration. The method also includes transmitting the multiple transmissions in the multiple time periods based on the beam hopping pattern.

In another aspect, a method for wireless communication at a UE is provided that includes scheduling a transmission in multiple time periods based on a hopping pattern, wherein the hopping pattern includes at least one of a precoder hopping pattern where the transmission is scheduled as multiple instances of the transmission for transmission across the multiple time periods using a different transmit or receive precoder over one or more transmission ports for each time period of the multiple time periods, or a time hopping pattern where the transmission is scheduled as multiple instances of the transmission for transmitting across the multiple time periods using different formats for each time period of the multiple time periods. The method also includes transmitting the transmission in the multiple time periods based on the hopping pattern.

In another aspect, a method for wireless communication at a network is provided that includes configuring a UE for scheduling multiple transmissions in multiple time periods based on a beam hopping pattern, where the beam hopping pattern includes at least one of at least one transmission of the multiple transmissions is scheduled as including at least one transmission part and across the multiple time periods using a different beam for each transmissions, or at least two transmissions of the multiple transmissions scheduled with a beam switching gap between the at least two transmissions that is less than a symbol in duration. The method also includes receiving the multiple transmissions in the multiple time periods based on the hopping pattern.

In another aspect, a method for wireless communication at a network is provided that includes configuring a UE for scheduling a transmission in multiple time periods based on a hopping pattern, where the hopping pattern includes at least one of a precoder hopping pattern where the transmission is scheduled as multiple instances of the transmission for transmission across the multiple time periods using a different transmit or receive precoder over one or more transmission ports for each time period of the multiple time periods, or a time hopping pattern where the transmission is scheduled as multiple instances of the transmission for transmitting across the multiple time periods using different formats for each time period of the multiple time periods. The method also includes receiving the transmission in the multiple time periods based on the hopping pattern.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
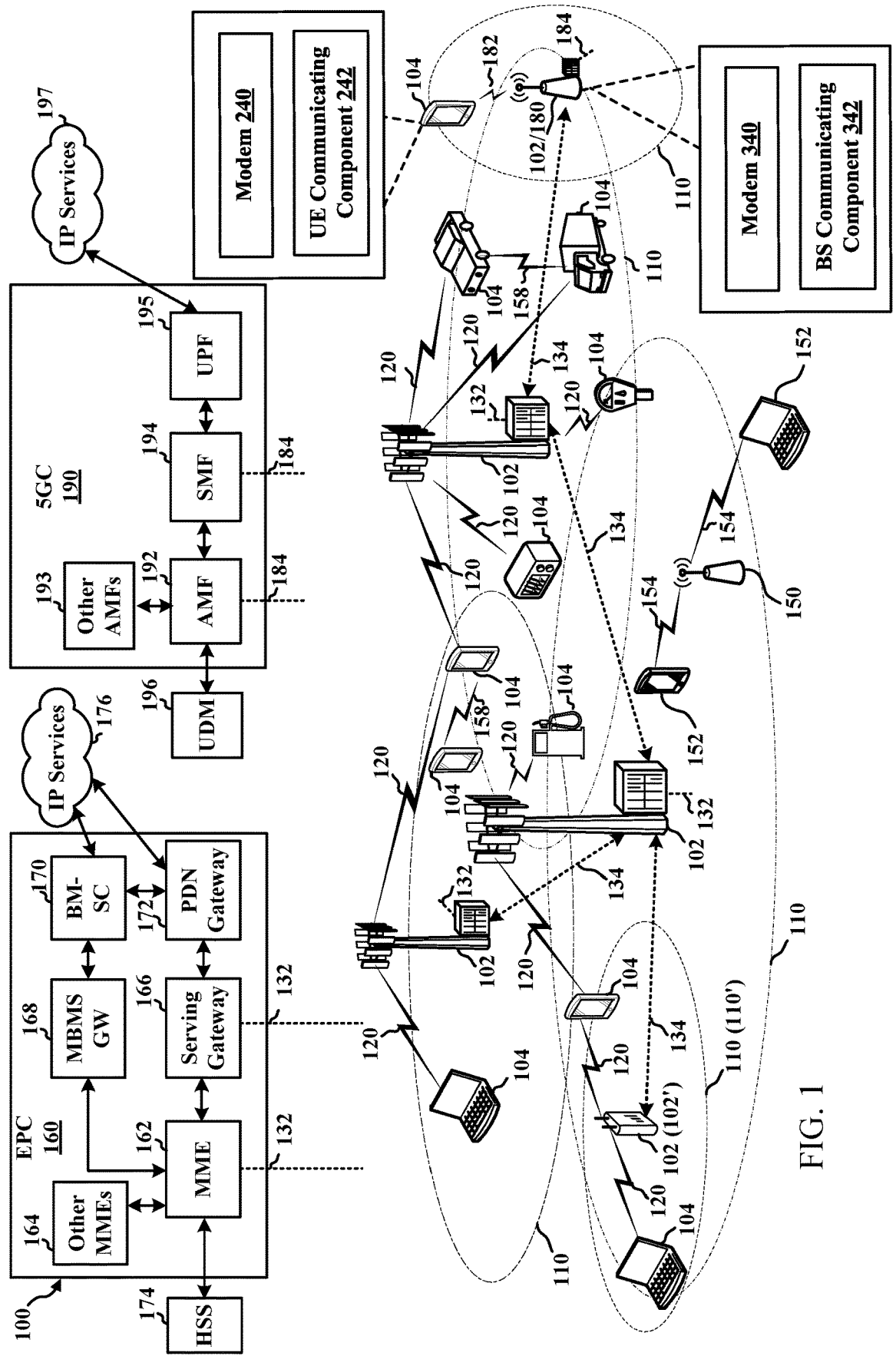
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to using single carrier waveforms for communications in higher bands. For example, in some wireless communication technologies, including third generation partnership project (3GPP) technologies such as fifth generation (5G) new radio (NR), etc., a user equipment (UE) or other device can transmit or receive communications using a single carrier waveform, which can utilize an entire bandwidth allocation over a period of time (e.g., an symbol). For example, in millimeter wave (mmWave) frequencies, such as frequency range 4 (FR4, up to 114 gigahertz (GHz)) frequency range 5 (FR5, up to 275 GHz), etc., a single carrier waveform can be used, which can be unfiltered and/or without discrete Fourier transform (DFT).

In particular, using a single carrier (SC) waveform can be beneficial over conventional orthogonal frequency division multiplexing (OFDM) at higher frequencies as it may be less affected by phase noise (e.g., as each SC symbol can be wideband, unlike OFDM subcarriers, and frequency offset has lesser impact), can have lower peak-to-average power ratio (PAPR) (e.g., as SC waveform may have no fast Fourier transform (FFT) or DFT block at the transmitter reducing PAPR and power amplifier (PA) backoff), can be easier to implement (e.g., as SC waveform has lesser number of transmitter blocks while a similar receiver can be maintained by adding cyclic prefix (CP) or guard interval (GI) to a symbol), and/or can be easier to scale bandwidth (e.g., as unlike OFDM which is limited by the complexity of the FFT block size, SC waveform can grow or shrink in bandwidth freely without computational overhead). Using a SC waveform, however, may not allow for diversity gains through frequency hopping, as the SC waveform uses symbols that occupy entire bandwidth, and are thus in the time domain.

Aspects described herein relate to providing hopping to achieve diversity for SC waveforms, including one or more of performing beam hopping to hop beams used for transmitting or receiving the SC waveforms over time, precoder hopping to hop precoders used for transmitting or receiving the SC waveforms over time, or time hopping to hop, within a nominal hop duration, time domain locations and/or durations over which the SC waveforms are transmitted over time. In particular, for example, the beam hopping may be performed in transmission parts, which may be a portion of a symbol (e.g., sub-symbol beam hopping), a symbol, etc., which may also include beam-switching gaps, which may also be sub-symbol, a symbol, etc.

In current 5G NR, for example, physical uplink control channel (PUCCH) can have one of formats 0 through 4, and frequency hopping may be possible on some of the PUCCH formats to achieve diversity. PUCCH can have beamforming by configuring one or more spatial relations between PUCCH and downlink signals such as channel state information reference signal (CSI-RS) or synchronization signal block (SSB). Multiple spatial relations can be configured, and media access control-control element (MAC-CE) can be used to indicate which spatial relation to use. Further, for simplicity purposes, in current 5G NR, PUCCH only uses a single antenna port, and thus any transmit diversity, if applied by the UE, must be applied in a specification transparent manner. As 5G NR matures, the standard may explicitly support multiple antenna ports for PUCCH for transmit diversity and/or multi-layer PUCCH transmission for higher uplink throughput. In one example, multi-port PUCCH can be configured to exploit precoder hopping in the future. PUCCH can be repeated in a number of slots (e.g., every 2, 4, or 8 slots) but using the same beam. Hence, time hopping may be limited to 2, 4, or 8 slots, which may not be enough to cross channel coherence time.

Using beam hopping, precoder hopping, and/or time hopping to provide transmit diversity, in accordance with aspects described herein, can provide various benefits. For example, effects of a fading channel can be mitigated by providing diversity. In addition, there may be a higher probability that the average signal-to-noise ratio (SNR) across multiple hops is higher than that in a single hop. Additionally, robustness to blocking can be provided and/or the need to invoke costly beam failure detection or beam failure recovery procedures can be reduced. In addition, beam hopping, precoder hopping, and/or time hopping can be more immune to cross-cell interference than not hopping. For example, each UE transmission can be subject to cross-cell interference from a neighboring cell, but by averaging across hops, summation of uncorrelated interference can result in less power compared to the sum of the correlated signal. Moreover, beam hopping, precoder hopping, and/or time hopping can reduce inter-user interference within a cell. For example, if users within a cell are multiplexed on the same time-frequency resource for PUCCH, but separated via precoders/beams, then having different precoder-hopping on each user can reduce their cross interference (probability of precoder-vectors of two users in all the hops being close to each other reduces as number of hops increases). These various benefits can improve quality of communications by increasing signal strength at least as received at the UE. This can also result in conserving communication resources, and accordingly improve user experience when using the UE.

The described features will be presented in more detail below with reference to FIGS. 1-24.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMTM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc.

discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and UE communicating component 242 for transmitting uplink communications using one or more of beam hopping, precoder hopping, or time hopping to achieve diversity, in accordance with aspects described herein. In addition, some nodes may have a modem 340 and BS communicating component 342 for receiving, from a UE, uplink communications using one or more of beam hopping, precoder hopping, or time hopping to achieve diversity, in accordance with aspects described herein. Though a UE 104 is shown as having the modem 240 and UE communicating component 242 and a base station 102/gNB 180 is shown as having the modem 340 and BS communicating component 342, this is one illustrative example, and substantially any node or type of node may include a modem 240 and UE communicating component 242 and/or a modem 340 and BS communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102 / UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152 / AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104.

When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (B SS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, UE communicating component 242 can schedule an transmission for transmitting over a channel (e.g., an uplink channel or sidelink channel) using at least one of beam hopping, precoder hopping, or time hopping to achieve transmit diversity. For example, UE communicating component 242 can transmit the transmission using beam hopping by hopping beams used to transmit the transmission over multiple transmission parts, which may be a symbol or less than a symbol in duration in one example. In another example, UE communicating component 242 can additionally or alternatively transmit the transmission using precoder hopping to change a precoder used to precode the transmission in different time instances (e.g., different transmission parts or symbols or slots). In another example, UE communicating component 242 can additionally or alternatively transmit the transmission using time hopping where a different repetition pattern can be used for the transmission in different time periods. In an example, BS communicating component 242 can configure the UE 104 to perform the hopping and/or can accordingly receive the transmission, or multiple instances of the transmission, based on the configured hopping.

Though the concepts described above and further herein are generally explained for uplink transmissions from a UE 104 to a base station 102, similar functionalities can be applied by a sidelink transmitting UE in transmitting sidelink communications to a sidelink receiving UE, where the sidelink receiving UE can include the functions of the BS communicating component 342 and the sidelink transmitting UE can include the functions of the UE communicating component 242.

Turning now to FIGS. 2-24, aspects are depicted with reference to one or more components and one or more methods that may perform the actions or operations described herein, where aspects in dashed line may be optional. Although the operations described below in FIGS. 4, 5, 13, 14, 19, and 20 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 2:
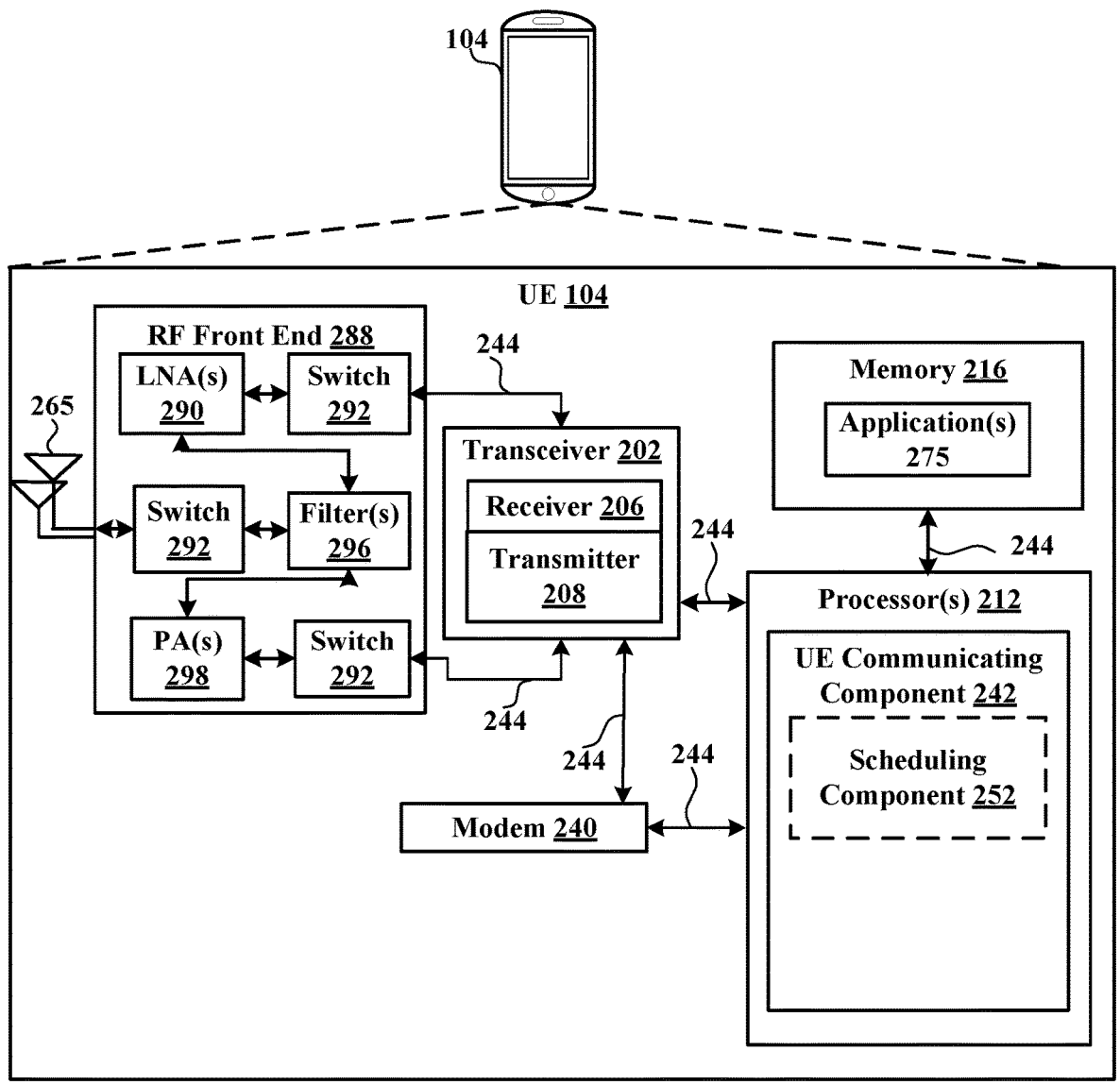
FIG. 2 is a block diagram illustrating an example of a user equipment (UE), in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or UE communicating component 242 for transmitting uplink communications using one or more of beam hopping, precoder hopping, or time hopping to achieve diversity, in accordance with aspects described herein.

In an aspect, the one or more processors 212 can include a modem 240 and/or can be part of the modem 240 that uses one or more modem processors. Thus, the various functions related to UE communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with UE communicating component 242 may be performed by transceiver 202.

Also, memory 216 may be configured to store data used herein and/or local versions of applications 275 or UE communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining UE communicating component 242 and/or one or more of its subcomponents, and/or data associated therewith, when UE 104 is operating at least one processor 212 to execute UE communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 242 can optionally include a scheduling component 252 for scheduling a transmission, or multiple instances of a transmission, using beam hopping, precoder hopping, or time hopping, in accordance with aspects described herein.

In an aspect, the processor(s) 212 may correspond to one or more of the processors described in connection with the UE in FIG. 24. Similarly, the memory 216 may correspond to the memory described in connection with the UE in FIG. 24.

Figure 3:
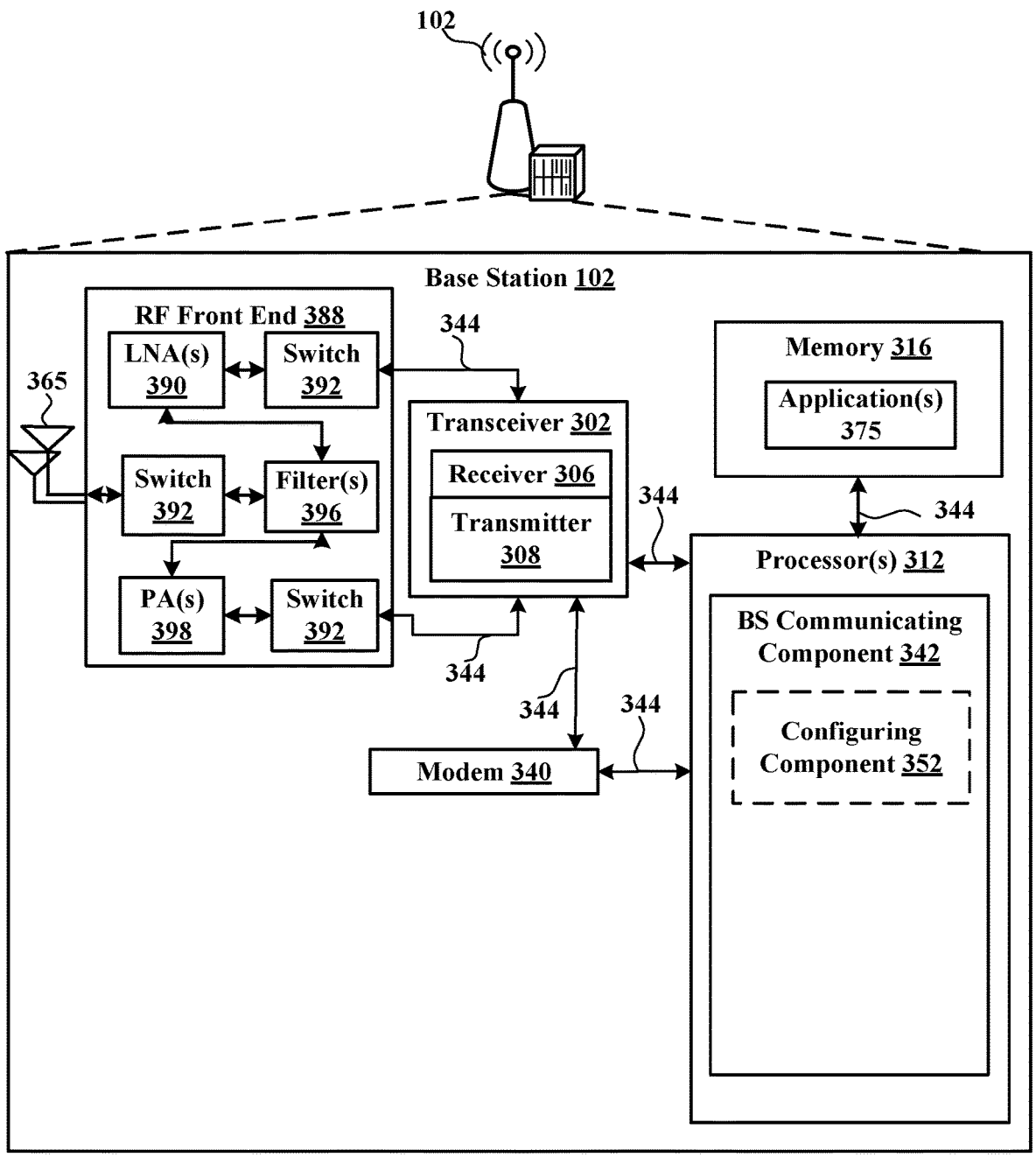
FIG. 3 is a block diagram illustrating an example of a base station, in accordance with various aspects of the present disclosure.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and BS communicating component 342 for receiving, from a UE, uplink communications using one or more of beam hopping, precoder hopping, or time hopping to achieve diversity, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, BS communicating component 342 can optionally include a configuring component 352 for configuring the UE to transmit uplink communications using one or more of beam hopping, precoder hopping, or time hopping to achieve diversity, in accordance with aspects described herein.

In an aspect, the processor(s) 312 may correspond to one or more of the processors described in connection with the base station in FIG. 24. Similarly, the memory 316 may correspond to the memory described in connection with the base station in FIG. 24.

Figure 4:
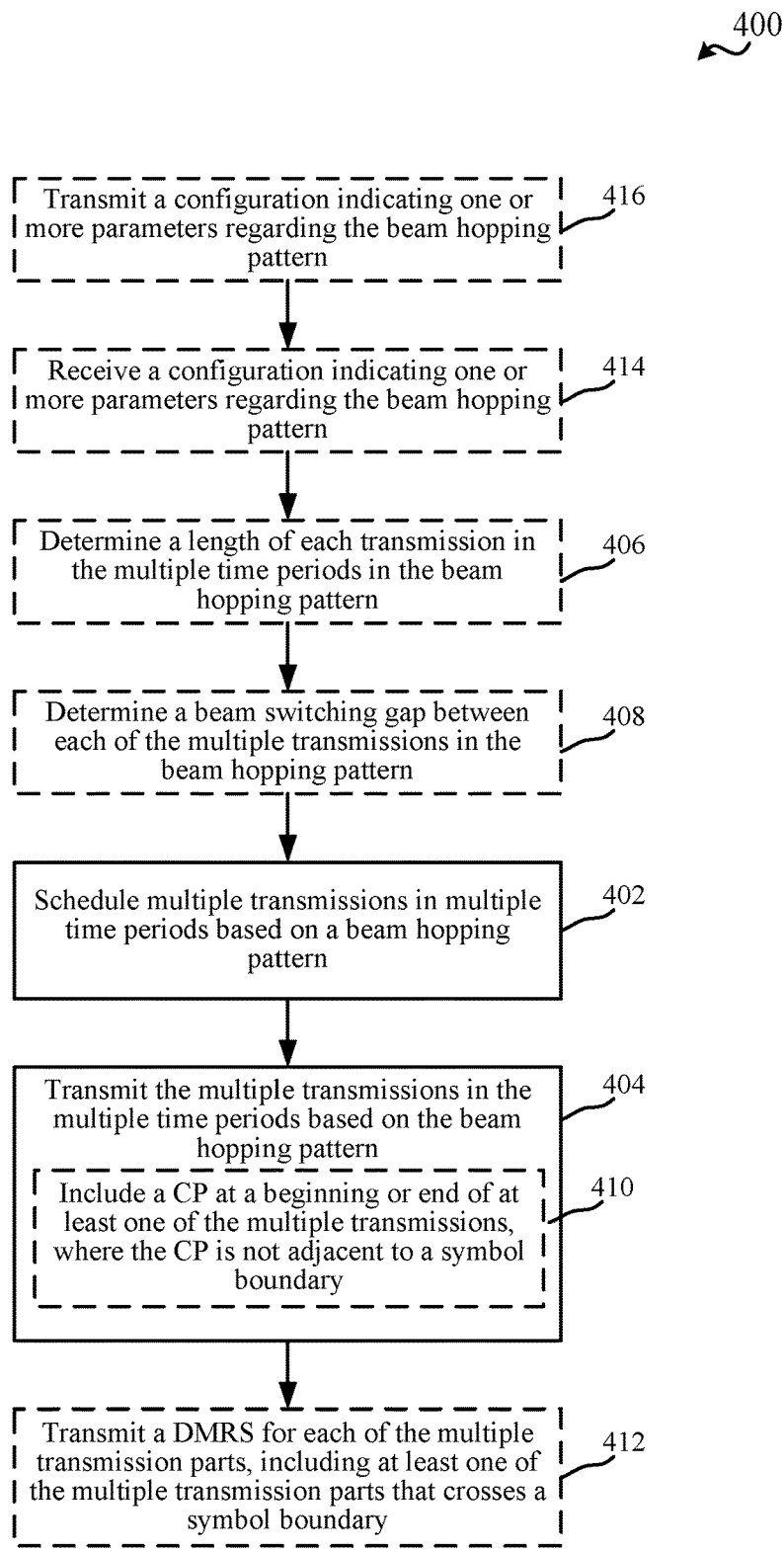
FIG. 4 is a flow chart illustrating an example of a method for scheduling transmissions based on a beam hopping pattern, in accordance with aspects described herein.
Figure 5:
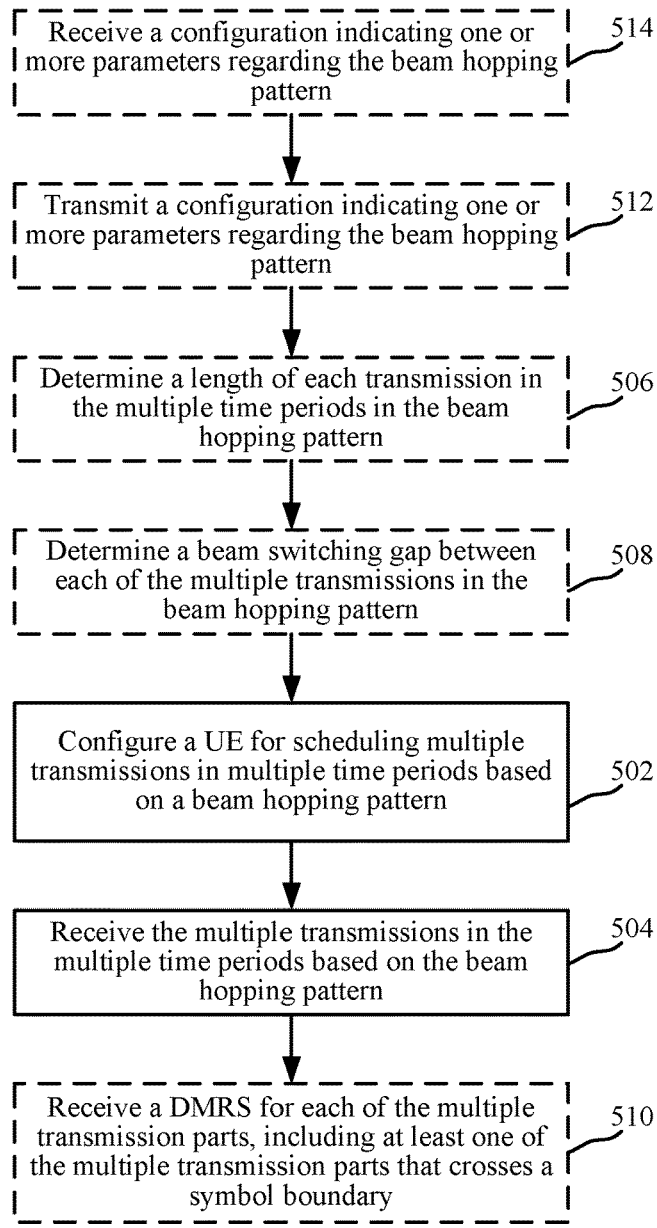
FIG. 5 is a flow chart illustrating an example of a method receiving transmissions based on a beam hopping pattern, in accordance with aspects described herein.

FIG. 4 illustrates a flow chart of an example of a method 400 for scheduling transmissions based on a beam hopping pattern, in accordance with aspects described herein. FIG. 5 illustrates a flow chart of an example of a method 500 for receiving transmissions based on a beam hopping pattern, in accordance with aspects described herein. Methods 400 and 500 are described in conjunction with one another below simply for ease of explanation, though the methods are not required to be performed in conjunction with one another, and indeed different nodes can perform either of method 400 or 500. In an example, a UE 104 or other transmitting node (e.g., a sidelink transmitting UE) can perform the functions described in method 400 using one or more of the components described in FIGS. 1 and 2, and a base station 102 or other node receiving communications from a UE (e.g., a sidelink receiving UE) can perform the functions described in method 500 using one or more of the components described in FIGS. 1 and 3.

In method 400, at Block 402, multiple transmissions can be scheduled in multiple time periods based on a beam hopping pattern. In an aspect, scheduling component 252, e.g., in conjunction with processor(s) 212, memory 216, transceiver 202, UE communicating component 242, etc., can schedule the multiple transmissions in multiple time periods based on the beam hopping pattern. In one example, the beam hopping pattern can include where at least one transmission of the multiple transmissions is scheduled as including at least one transmission part and across the multiple time periods using a different beam for each of multiple transmission. In another example, the bean hopping pattern can include where at least two transmissions of the multiple transmissions scheduled with a beam switching gap between the at least two transmissions that is less than a symbol in duration. For example, scheduling component 252 can schedule the transmission across the multiple time periods using beam hopping such to use a different beam to transmit the transmission in each of the multiple time periods. For example, scheduling component 252 can select the beam from multiple beams configured for using by the UE 104, which may be based on multiple transmission configuration indicator (TCI) states configured and/or activated for the UE 104. An example is shown in FIG. 6.

Figure 6:
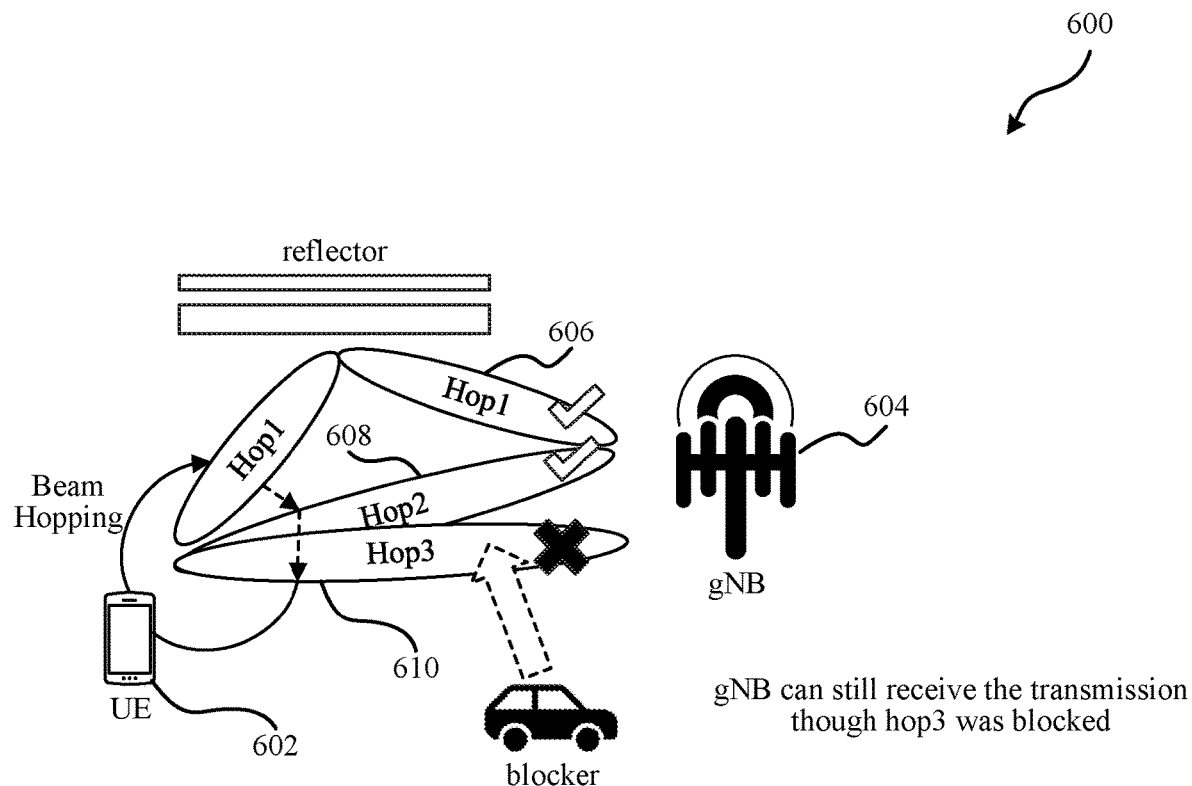
FIG. 6 illustrates an example of a wireless communication system including a UE and gNB in wireless communications with one another, in accordance with aspects described herein.

FIG. 6 illustrates an example of a wireless communication system 600 including a UE 602 and gNB 604 in wireless communications with one another. UE 104 can perform beam hopping over time, as described herein, to provide diversity for uplink transmissions. In this regard, for example, UE 602 can transmit the uplink transmission using a first beam in a first time period at hop 1 606, a second beam in a second time period at hop 2 608, and a third beam in a third time period at hop 3 610. The gNB 604 may receive the uplink transmission at least via the beams transmitted at hop 1 606 and hop 2 608, though hop 3 610 may be blocked.

In addition, for example, a transmission part, as referred to herein, can include a smallest part of a transmission (e.g., a PUCCH) that can have independent beamforming. The length of the transmission part can be less than one symbol. In one example, the length of the transmission part can be configurable by a network (e.g., received in a configuration, as described in Block 414). A transmission, such as a PUCCH, can be of a certain length that can be separated into at least one of transmission part, which may include one or more full PUCCH symbols or one or more PUCCH parts, as described above and further herein. In an example, the transmission can be separated into one or more PUCCH parts that are less than a symbol in duration (e.g., where multiple PUCCH parts may or may not together be a duration of a full symbol). In another example, the transmission can be a combination of one or more PUCCH parts and one or more full PUCCH symbols.

For example, if both PUCCH part(s) and PUCCH symbols are configured for a PUCCH, then a contiguous PUCCH transmission can start with a PUCCH symbol and end with a PUCCH part. In another example, splitting multiple PUCCH parts among multiple PUCCH symbols can be configured by the base station, and/or can be configured per hopping scheme (e.g., differently for beam hopping than for precoder hopping or time hopping). For example, in beam hopping, it may suffice for a single beam hop to have just one sub-symbol transmission part. In time hopping, however, it may make sense to have a contiguous block of symbol(s) and part and another contiguous block of symbol(s) and part within a nominal time hop, as described further herein.

In an example, a transmission part can be a sequence (e.g., a PUCCH sequence) that is around a few hundred samples long, instead of full approximately fourth thousand sample length. In addition, for example, transmission parts can be repeated just like symbols (e.g., PUCCH symbols). Moreover, in an example, a length of a transmission part can be waveform dependent (e.g., dependent on the waveform used for transmitting the transmission), and thus, for example, UE communicating component 242 can determine a length for the transmission based on waveform type.. For example, one symbol for discrete Fourier transform (DFT)-spread(s)-OFDM waveform, or K samples where 0<K <symbol-length for single carrier quadrature amplitude modulation (QAM) waveform where K is up to the channel format (e.g. PUCCH format) of the transmission. For instance, as latency sensitive applications such as augmented reality (AR)/virtual reality (VR) gaming become more prevalent, the need for short uplink control signaling may increase and smaller transmission parts may be more efficient. Sub-symbol parts may be feasible due to the time domain nature of single carrier waveform, unlike OFDM.

In method 400, at Block 404, the multiple transmissions can be transmitted in the multiple time periods based on the beam hopping pattern. In an aspect, UE communicating component 242, e.g., in conjunction with processor(s) 212, memory 216, transceiver 202, etc., can transmit the multiple transmissions in the multiple time periods based on the beam hopping pattern. For example, UE communicating component 242 can transmit the transmission in a first time period, which may include one or more symbols and/or one or more transmission parts, and/or a combination of one or more symbols and one or more transmission parts, using a first beam, in a second time period using a second beam different from the first beam, etc., as described above and further herein. As described, for example, a base station 102 or other node (e.g., SL receiving UE) can configure the UE 104 to transmit the transmissions using beam hopping and/or can configure one or more parameters regarding transmission part length, the number of symbols and/or transmission parts per time period, and/or the like.

In method 500, at Block 502, a UE can be configured for scheduling multiple transmissions in multiple time periods based on a beam hopping pattern. In an aspect, configuring component 352, e.g., in conjunction with processor(s) 312, memory 316, transceiver 302, BS communicating component 342, etc., can configure the UE (e.g., UE 104) for scheduling the multiple transmissions in multiple time periods based on the beam hopping pattern. As described, in one example, the beam hopping pattern can include where at least one transmission of the multiple transmissions is scheduled as including at least one transmission part and across the multiple time periods using a different beam for each of multiple transmission. In another example, the bean hopping pattern can include where at least two transmissions of the multiple transmissions scheduled with a beam switching gap between the at least two transmissions that is less than a symbol in duration. For example, configuring component 352 can configure the UE with information on beams to use, transmission part division or location within a symbol slot, the number of symbols and/or transmission parts per time period, beams to use for each transmission or collection of one or more symbols and/or one or more transmission parts in a beam hop, etc., and/or the like. In another example, a length of the transmission can be configured as the one or more transmission parts, or may also include one or more symbols, or a combination of one or more symbols and one or more transmission parts that are a portion of a symbol. As described further herein, for example, configuring component 352 can configure the transmission as a number of symbols (e.g., one or more symbols) plus a number of transmission parts that may be a partial symbol in duration (e.g., one or more transmission parts).

In one example, configuring component 352 can configure a number $n^{bh}_{pp}$ of transmission parts (e.g., PUCCH part) per beam hop. The length of the transmission, including full symbols, transmission parts that may be part of a symbol in duration, etc., in a beam hop (e.g., the transmission parts occurring before a next beam hop) can use the same beam. In an example, configuring component 352 can specify different beams to use for each beam hop. In another example, configuring component 352 can specify beam switching gaps to be applied between beam hops (e.g., to allow time to configure antenna resources from one beam to another beam), where the beam switching gaps may be based on a UE capability or other indication from the UE 104. In an example, a beam switching gap can be one symbol or a sub-symbol in duration. Where the beam switching gap is sub-symbol, for example, scheduling component 252 and/or BS communicating component 342 receiving the beams can determine a next beam hop starting location by adding the beam switching gap to the last beam hop ending location in time.

For example, as described, UE 104 can transmit communications in a slot including a number of symbols, which can be defined and configured by a base station. UE communicating component 242 can transmit the transmissions using different beams over one or more transmissions, where each transmission may include a symbol and/or one or more transmission parts, as described. In an example, different options for configuring transmission parts and beam switching gaps can be possible depending on whether a transmission or transmission part can cross a symbol boundary or not. In an example, changing a fast Fourier transform (FFT) window can allow for detecting a transmission part across symbol boundary. Examples are shown in FIGS. 7-12.

Figure 7:
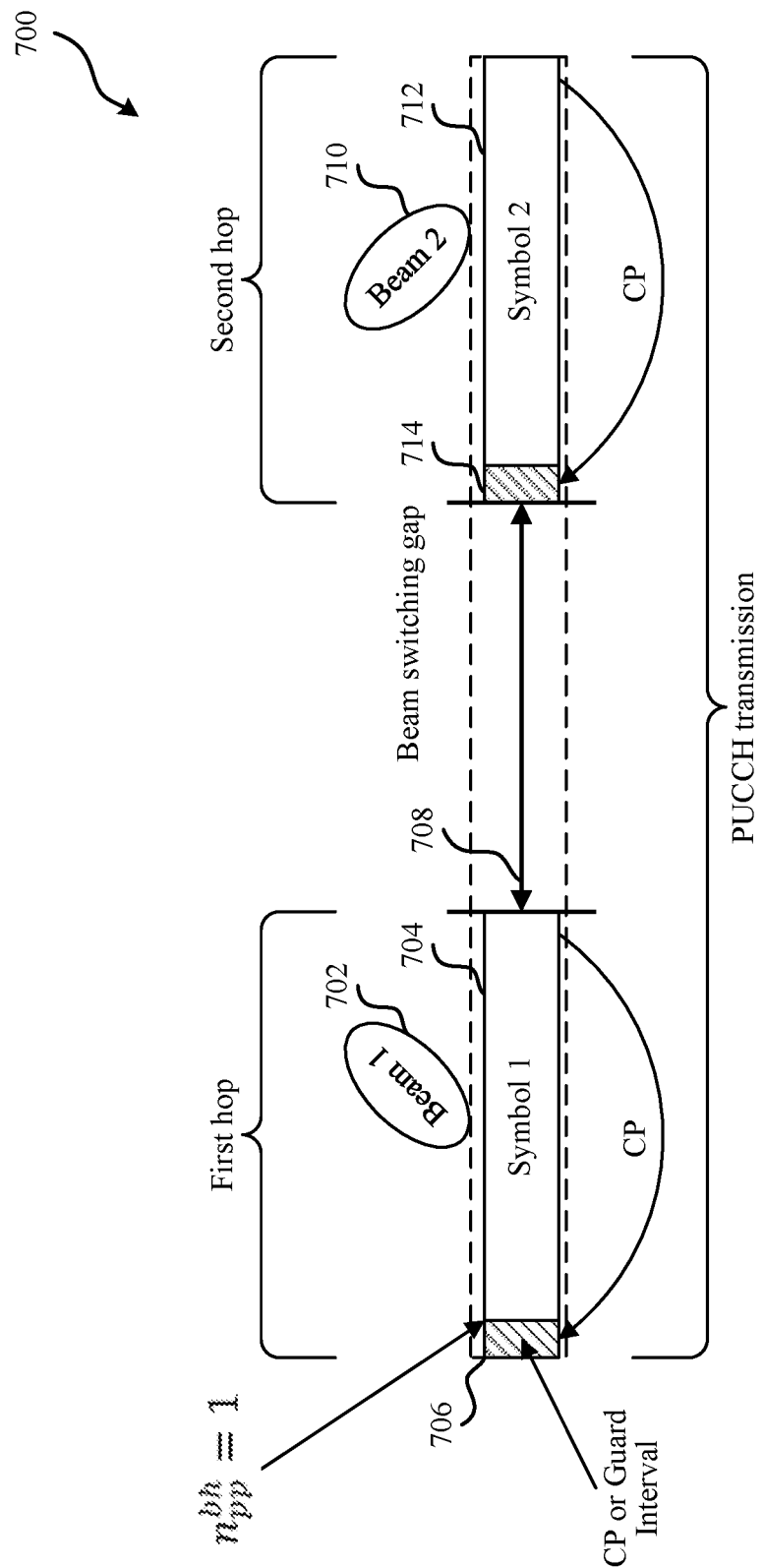
FIG. 7 illustrates an example of a timeline for transmitting a transmission with beam hopping where the transmission length and its cyclic prefix (CP), and beam switching gap, are each a duration of a symbol, in accordance with aspects described herein.

FIG. 7 illustrates an example of a timeline 700 for transmitting a transmission with beam hopping where the transmission length and its CP, and beam switching gap, are each a duration of a symbol (referred to as full symbol). In timeline 700, $n^{bh}_{pp}=1$ and a UE 104 can transmit a first beam, beam 1 702, in transmission symbol 1 704, which can also have a CP or GI 706, and can occupy a symbol. The UE 104 can switch to a second beam, beam 2 710, during the beam switching gap 708, which can occupy a second symbol, which can be adjacent, in time, to the first symbol. The UE 104 can then, in a third symbol, which can be adjacent, in time, to the second symbol, transmit the second beam, beam 2 710, in transmission symbol 2 712, which can also include CP 714.

Figure 8:
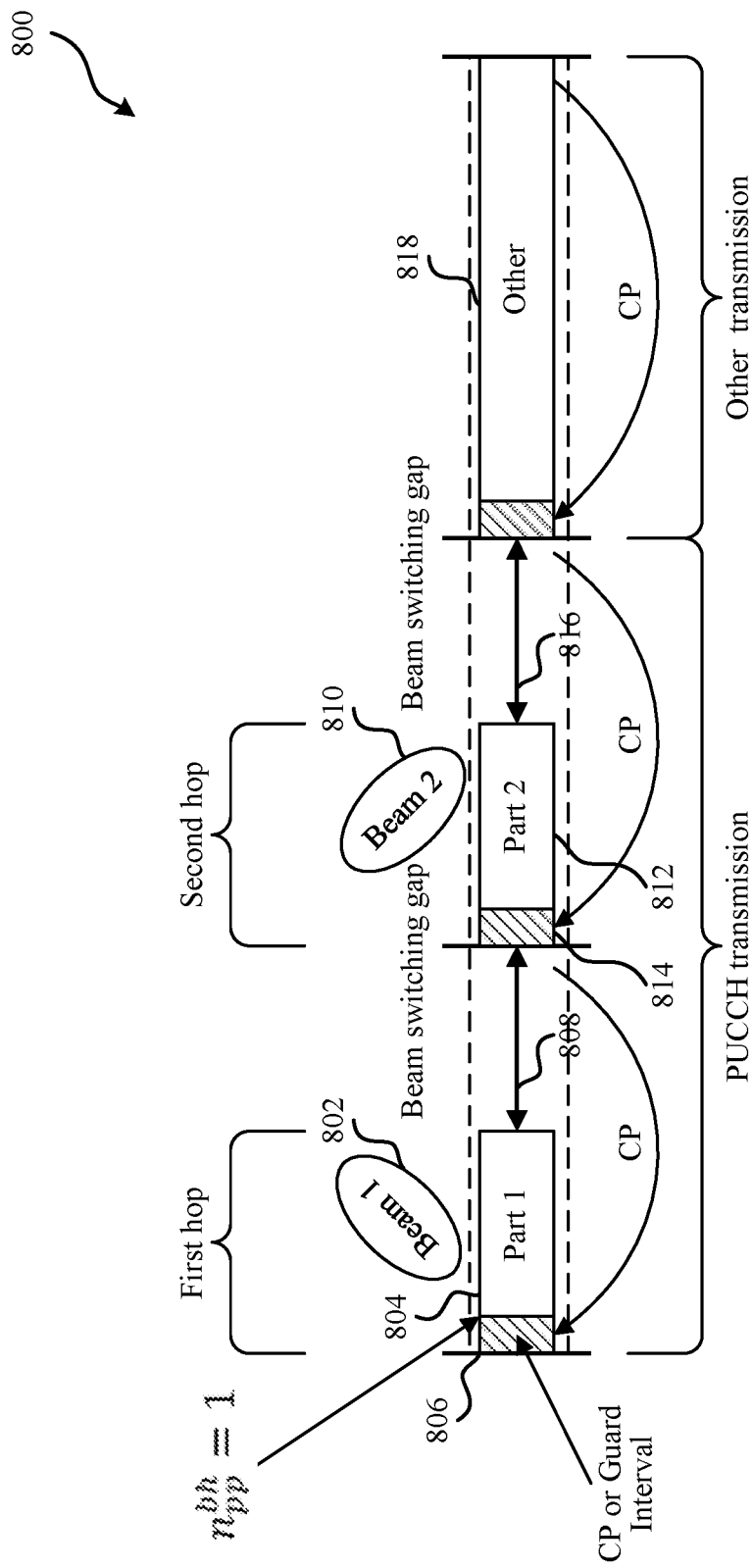
FIG. 8 illustrates an example of a timeline for transmitting a transmission with beam hopping where the transmission part, its CP, and beam switching gap, are each a portion of a symbol, and together a duration of a symbol, in accordance with aspects described herein.

FIG. 8 illustrates an example of a timeline 800 for transmitting a transmission with beam hopping where the transmission part, its CP, and beam switching gap, are each a portion of a symbol (referred to as part symbol), and together a duration of a symbol (full symbol). In timeline 800, $n^{bh}_{pp}=1$ and a UE 104 can transmit a first beam, beam 1 802, in transmission part 1 804, which can also have a CP or GI 806, and can have less of a duration than a symbol. Transmission gap 804, CP 806, and beam switching gap 808 can be of a duration of a symbol. The UE 104 can switch to a second beam, beam 2 810, during the beam switching gap 808. Similarly, UE 104 can transmit the second beam, beam 2 810, in transmission part 2 812, which can also have a CP or GI 814, and can have less of a duration than a symbol. Transmission gap 812, CP 814, and beam switching gap 816 can be of a duration of a symbol. During beam switching gap 816, the UE 104 can switch its beam for another transmission symbol 818.

Figure 9:
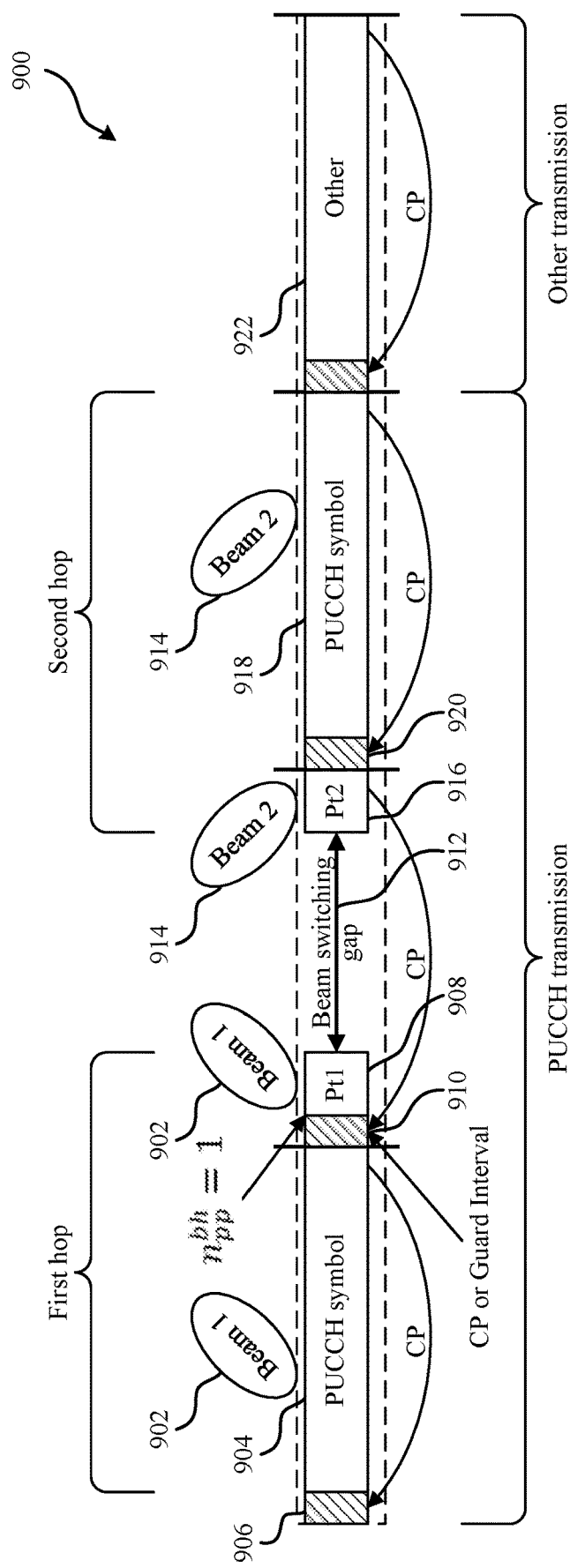
FIG. 9 illustrates an example of a timeline for transmitting a transmission with beam hopping where multiple transmission parts and beam switching gap are each part symbol, and together a duration of a symbol, in accordance with aspects described herein.

FIG. 9 illustrates an example of a timeline 900 for transmitting a transmission with beam hopping where multiple transmission parts and beam switching gap are each part symbol, and together a duration of a symbol (full symbol). In timeline 900, UE 104 can transmit a first beam, beam 1 902, for PUCCH symbol 904, which can also have a CP or GI 906, and can have a duration of a symbol. In the next symbol, $n^{bh}_{pp}=1$ and UE 104 can transmit the first beam 1 902 in transmission part 1 908, which is part symbol and has CP or GI 910. Thus, for example, a length of the PUCCH transmission per hop can be defined by a number of PUCCH symbols in the hop (e.g., 1 symbol 904) and a number of transmission parts per hop (e.g., 1 transmission part 908). In one example, PUCCH symbol 904, CP 906, CP 910, and transmission part 908 can be transmitted using the same beam. In timeline 900, transmission part 908 can be followed by beam switching gap 912, which is part symbol and during which the UE 104 can switch to the second beam 2 914, followed by the second beam 2 914 in transmission part 916, which is part symbol. The first transmission part 908, the beam switching gap 912, and the second transmission part 916 can together occupy a symbol (e.g., a duration of a symbol). In a next symbol, the UE 104 can continue using beam 2 914 for a PUCCH symbol 918, having CP or GI 920. Thus, for example, the length of the PUCCH transmission using beam 2 can be defined by a number of PUCCH symbols in the hop (e.g., 1 symbol 918) and a number of transmission parts per hop (e.g., 1 transmission part 916). In one example, transmission part 916, CP 920 and PUCCH symbol 918, can be transmitted using the same beam. In this example, the transmission part (PUCCH part) definition can be used for the symbol where beam switching happens. Prior PUCCH symbols in a beam hop can have arbitrary multiplexing of PUCCH parts. In another example, the transmission part (PUCCH part) definition can be applied to the symbol after a configured number of PUCCH symbols per hop.

Figure 10:
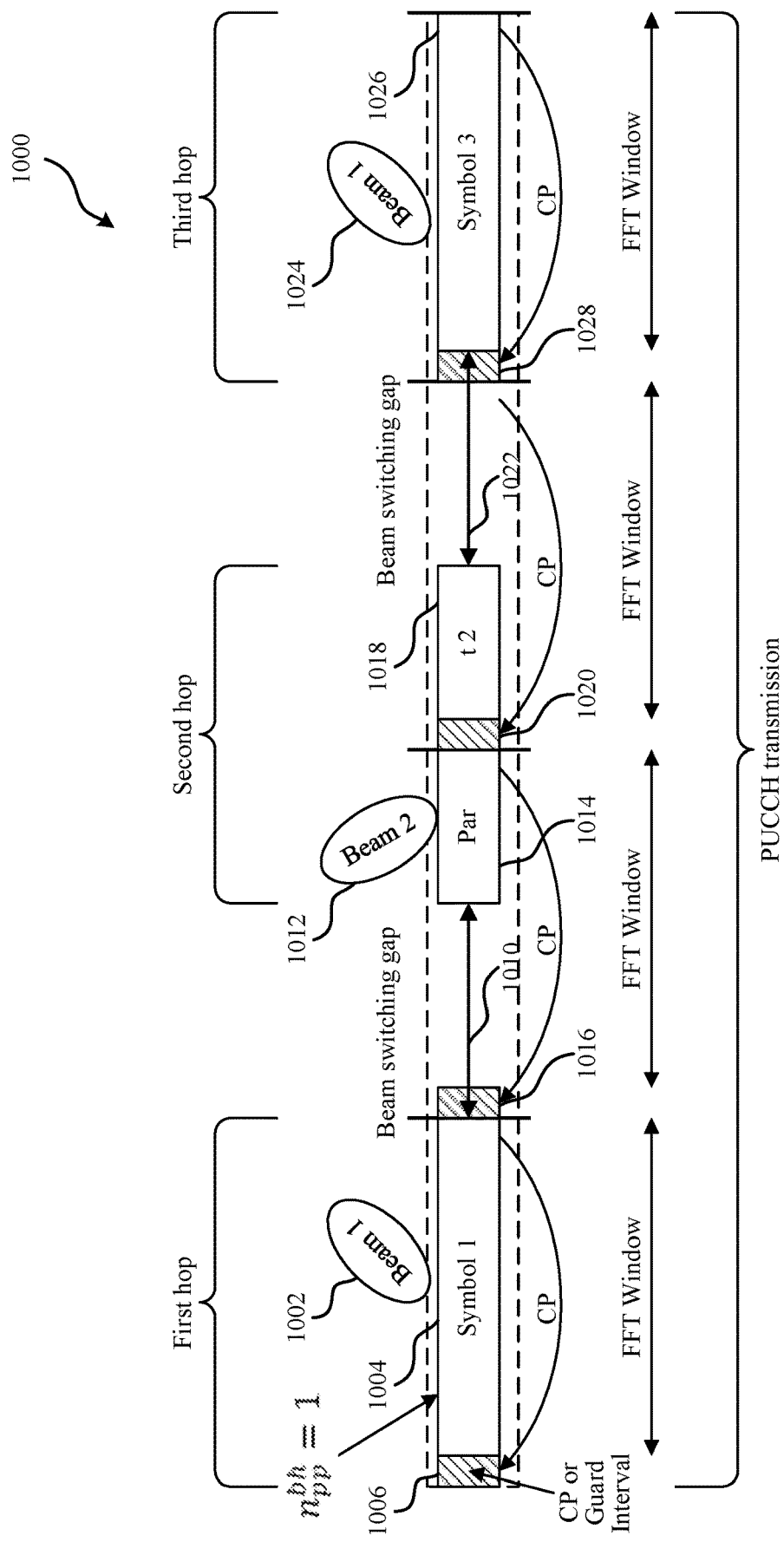
FIG. 10 illustrates an example of a timeline for transmitting, without fast Fourier transform (FFT) window shifting, a transmission with beam hopping where transmission lengths are full symbol and beam switching gaps part symbol, in accordance with aspects described herein.

FIG. 10 illustrates an example of a timeline 1000 for transmitting, without FFT window shifting, a transmission with beam hopping where transmission lengths are full symbol (but may include multiple partial symbol transmission parts) and beam switching gaps part symbol, and thus transmission parts can cross symbol boundaries. In timeline 1000, $n^{bh}_{pp}=1$ and UE 104 can transmit a first beam, beam 1 1002, in symbol 1 1004, which can also have a CP or GI 1006, and can have a duration of a symbol. In the next symbol, beam switching gap 1010 can be part symbol, and beam 2 1012 can be used to transmit the second transmission in two transmission parts that can together be a full symbol in duration—a first transmission part 1014 in the second symbol, and associated CP or GI 1016, and a second transmission part 1018 in the next symbol, and associated CP or GI 1020. This third symbol can also have beam switching gap 1022, during which the UE 104 can switch back to beam 1 1024 for transmitting symbol 3 1026, having CP or GI 1028, and having a full symbol duration in the fourth symbol. In this example, PUCCH parts may cross symbol boundaries and can be full symbol, but beam switching gap may be part symbol. For example, for 16 GHz bandwidth, 1 symbol=four thousand (4K) single carrier (SC) QAM samples span 256 nanoseconds (ns) and 100 ns is a typical beam switching time then one half symbol=128 ns may be chosen as the beam switching gap. The example in FIG. 10 shows how three PUCCH hops with one part per hop can be accomplished in four symbols using the above calculation and without FFT window shifting.

Figure 11:
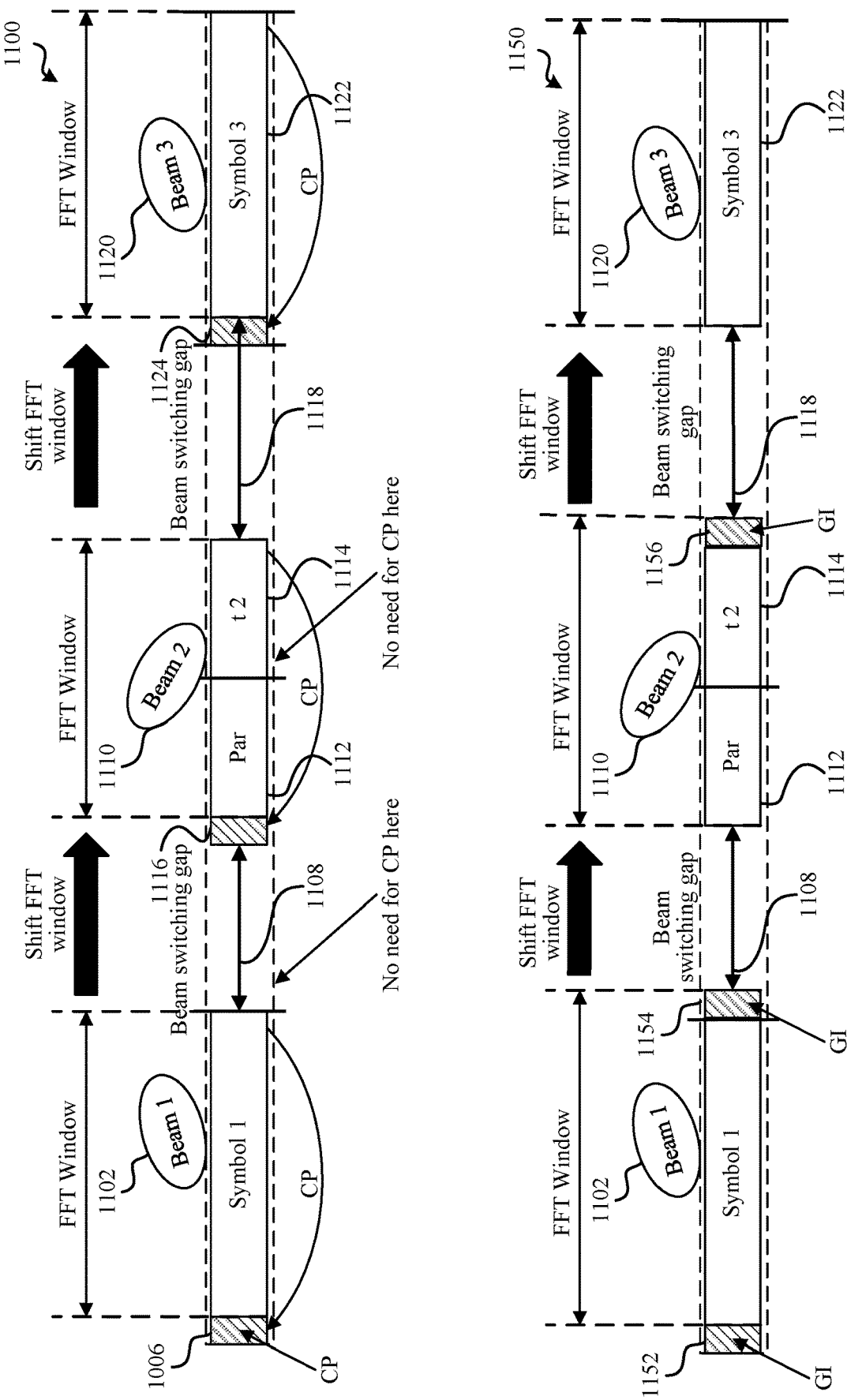
FIG. 11 illustrates examples of timelines for transmitting, with FFT window shifting, a transmission with beam hopping where transmission parts are full symbol and beam switching gaps part symbol, in accordance with aspects described herein.

FIG. 11 illustrates an example of a timeline 1100 for transmitting, with FFT window shifting, a transmission with beam hopping where transmissions are full symbol, whether a symbol or parts spanning symbols, and beam switching gaps part symbol, and thus transmission parts can cross symbol boundaries. In timeline 1100, $n^{bh}_{pp}=1$ and UE 104 can transmit a first beam, beam 1 1102, in symbol 1 1104, which can also have a CP 1106, and can have a duration of a symbol. In the next symbol, beam switching gap 1108 can be part symbol, and beam 2 1110 can be used to transmit the transmission in two transmission parts—a first transmission part 1112 in the second symbol, and associated CP 1116, and a second transmission part 1114 in the next symbol, which may not need CP as the FFT window is shifted past the beam switching gap 1108 to transmit (or receive) the second transmission part. This third symbol can also have beam switching gap 1118, during which the UE 104 can switch to beam 3 1120 for transmitting symbol 3 1122, having CP 1124, and having a full symbol duration in the fourth symbol. The FFT window can again be shifted past the beam switching gap 1118 to transmit (or receive) symbol 3 1122.

FIG. 11 illustrates an example of another timeline 1150 for transmitting, with FFT window shifting, a transmission with beam hopping where transmissions are full symbol, whether a symbol or parts spanning symbols, and beam switching gaps part symbol, and thus transmission parts can cross symbol boundaries. In timeline 1150, $n^{bh}_{pp}=1$ and UE 104 can transmit a first beam, beam 1 1102, in symbol 1 1104, where symbol 1 1104 can include a GI 1154 before a next symbol boundary. After the symbol boundary, beam switching gap 1108 can be part symbol, and beam 2 1110 can be used to transmit the transmission in two transmission parts—a first transmission part 1112 in the second symbol, and a second transmission part 1114 in the next symbol, which may have a GI 1156 following the second transmission part 1114. For both symbol 1 1102 and the second symbol that includes transmission part 1112 and transmission part 1114, the FFT window can be shifted to include the corresponding GIs 1154, 1156. The third symbol can also have beam switching gap 1118, during which the UE 104 can switch to beam 3 1120 for transmitting symbol 3 1122, having a full symbol duration in the fourth symbol. The FFT window can again be shifted past the beam switching gap 1118 to transmit (or receive) symbol 3 1122.

As shown in FIG. 11, the designs can work with both CP and GI waveforms where GI can be within a symbol boundary while CP can be outside the symbol boundary. In an example, waveforms having GI may be similar across subsequent FFT windows to enable successful decoding, whereas CP-based waveforms can have CP changes each symbol. In addition, for example, GI samples can be independent samples (e.g., not derived from data). In another example, GI samples may be some specific samples derived from a sequence or zeros. The examples in FIG. 11 can work for both non-coherent and coherent PUCCH as it shifts the FFT window to span two symbols.

Figure 12:
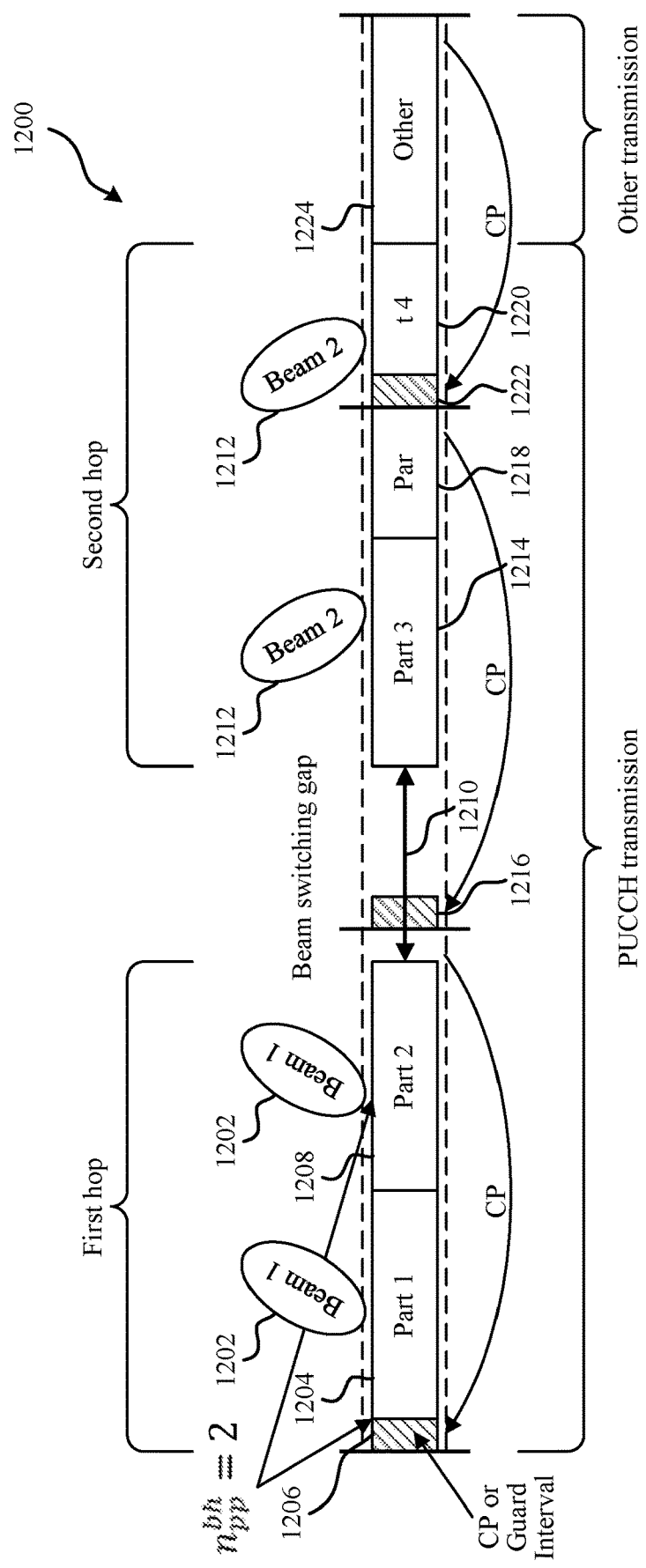
FIG. 12 illustrates an example of a timeline for transmitting a transmission with beam hopping where transmission parts are part symbol and beam switching gaps part symbol, and transmission parts can cross symbol boundaries, in accordance with aspects described herein.

FIG. 12 illustrates an example of a timeline 1200 for transmitting a transmission with beam hopping where transmission parts are part symbol and beam switching gaps part symbol, and transmission parts can cross symbol boundaries. In timeline 1200, $n^{bh}_{pp}=2$ and UE 104 can transmit a first beam, beam 1 1202, in transmission part 1 1204, which can also have a CP or GI 1206, and can have a part symbol duration. UE 104 can transmit the first beam, beam 1 1202, in transmission part 2 1208 as well, which can also use CP or GI 1206, and can have a part symbol duration. Beam switching gap 1210 can also be part symbol, and beam 2 1212 can be used to transmit transmission part 3 1214 in the next symbol, which can have CP or GI 1216. UE 104 can transmit beam 2 1212 for transmission part 4 as well, which can be transmitted in in two portions the cross a symbol boundary—a first portion 1218, using associated CP or GI 1216, and a second portion 1220 in the next symbol, having associated CP or GI 1222. The UE 104 can transmit another transmission part 1224 following the second portion 1220 of transmission part 4. In this example, a beam hop may include PUCCH parts that cross symbol boundary. If so, each split of a PUCCH part can have a DMRS to enable independent channel estimation and decoding.

In some examples, UE 104 can transmit the transmission using one or more of the beam hopping patterns described above. In an example, base station 102 can configure the UE 104 to use one or more of the beam hopping patterns described above based on configuring one or more related parameters, as described above and further herein, such as beams to be used for each hop, a number of hops, transmission part duration or location, beam switching gap duration or location, the number of symbols and/or transmission parts per time period, etc. Accordingly, the base station 102 can receive the transmissions from the UE 104 in the configured symbols and/or transmission parts and based on the associated beams defined for the transmission including one or more symbols and/or one or more transmission parts.

In method 500, at Block 504, the multiple transmissions can be received in the multiple time periods based on the beam hopping pattern. In an aspect, BS communicating component 342, e.g., in conjunction with processor(s) 312, memory 316, transceiver 302, etc., can receive the multiple transmissions in the multiple time periods based on the beam hopping pattern. For example, BS communicating component 342 can receive the transmission in a first time period, which may include one or more symbols and/or one or more transmission parts, and/or a combination of one or more symbols and one or more transmission parts, using a first beam, in a second time period using a second beam different from the first beam, etc. As described, the transmissions can be configured to include one or more symbols and/or one or more transmission parts. In addition, for example, the beam switching gaps can be configured as full symbol, part symbol, etc., as described above and further herein.

In method 400, optionally at Block 406, a length of each transmission in the multiple time periods in the beam hopping pattern can be determined. In an aspect, scheduling component 252, e.g., in conjunction with processor(s) 212, memory 216, transceiver 202, UE communicating component 242, etc., can determine the length of each transmission in the multiple time periods in the beam hopping pattern. For example, scheduling component 252 can determine the length of a transmission as one or more symbols and/or one or more transmission parts, which may include determining the length of a transmission part based on a length hardcoded in a memory 216 of the UE 104 (e.g., based on a wireless communication technology standard). In another example, scheduling component 252 can determine the length of a transmission part by computing the length based on a number of transmission parts per hop, a beam switching gap, a restriction that the transmission part or parts and/or the beam switching gap must be a symbol duration, and/or the like. In another example, scheduling component 252 can receive an indication of the length of the transmission part in a configuration (e.g., from the base station 102, SL UE, etc.). In another example, scheduling component 252 can determine the length of the transmission, or transmission part, based on a UE capability, which UE 104 may report to the base station 102. In any case, scheduling component 252 can schedule the transmission, which can including scheduling in one or more transmission parts based on the determined length.

In method 500, optionally at Block 506, a length of each transmission in the multiple time periods in the beam hopping pattern can be determined. In an aspect, configuring component 352, e.g., in conjunction with processor(s) 312, memory 316, transceiver 302, BS communicating component 342, etc., can determine the length of each transmission in the multiple time periods in the beam hopping pattern. For example, configuring component 352 can determine the length of the transmission, which may include determining the length of a transmission part based on a length hardcoded in a memory 316 of the BS 102 (e.g., based on a wireless communication technology standard). In another example, configuring component 352 can determine the length of a transmission part by computing the length based on a number of transmission parts per hop, a beam switching gap, a restriction that the transmission part or parts and/or the beam switching gap must be a symbol duration, and/or the like. In an example, the length of PUCCH may include a configured integer number of symbols plus a number of PUCCH parts. In another example, configuring component 352 can transmit an indication of the length of the transmission part in a configuration (e.g., to the UE 104). In another example, scheduling component 252 can determine the length of the transmission part based on a UE capability, which UE 104 may report to the base station 102. In any case, BS communicating component 342 can receive the transmission in one or more transmission parts based on the determined length.

In method 400, optionally at Block 408, a beam switching gap between each of the multiple transmissions in the beam hopping pattern can be determined. In an aspect, scheduling component 252, e.g., in conjunction with processor(s) 212, memory 216, transceiver 202, UE communicating component 242, etc., can determine the beam switching gap between each of the multiple transmissions in the beam hopping pattern. For example, scheduling component 252 can determine the beam switching gap based on a length hardcoded in a memory 216 of the UE 104 (e.g., based on a wireless communication technology standard). In another example, scheduling component 252 can determine the beam switching by computing the gap based on a number of symbols and/or transmission parts per hop, a restriction that the transmissions and/or the beam switching gap must be a symbol duration, and/or the like. In another example, scheduling component 252 can receive an indication of the length of the beam switching gap in a configuration (e.g., from the base station 102, SL UE, etc.). In another example, scheduling component 252 can determine the beam switching gap based on a UE capability, which UE 104 may report to the base station 102. In any case, scheduling component 252 can schedule the transmissions based on providing the beam switching gap between beam hops to allow the UE 104 time to switch beams.

In method 500, optionally at Block 508, a beam switching gap between each of the multiple transmissions in the beam hopping pattern can be determined. In an aspect, configuring component 352, e.g., in conjunction with processor(s) 312, memory 316, transceiver 302, BS communicating component 342, etc., can determine a beam switching gap between each of the multiple transmissions in the beam hopping pattern. For example, configuring component 352 can determine the beam switching gap based on a length hardcoded in a memory 316 of the BS 102 (e.g., based on a wireless communication technology standard). In another example, configuring component 352 can determine the beam switching gap by computing the length based on a number of symbols and/or transmission parts per hop, a restriction that the transmissions and/or the beam switching gap must be a symbol duration, and/or the like. In another example, configuring component 352 can transmit an indication of the length of the beam switching gap in a configuration (e.g., to the UE 104). In another example, scheduling component 252 can determine the beam switching gap based on a UE capability, which UE 104 may report to the base station 102. In any case, BS communicating component 342 can receive the transmissions based on the beam switching gap between transmission parts having different beams.

In transmitting the transmission at Block 404, optionally at Block 410, a CP can be included at the beginning or end of at least one of the multiple transmissions, where the CP is not adjacent to a symbol boundary. In an aspect, scheduling component 252, e.g., in conjunction with processor(s) 212, memory 216, transceiver 202, UE communicating component 242, etc., can include the CP at the beginning or end of at least one of the multiple transmissions, where the CP is not adjacent to a symbol boundary. For example, as shown in FIG. 11, scheduling component 252 can place the CP 1116 at the beginning of transmission part 1112 to provide CP for the transmission part 1112, though the transmission part 1112 and CP 1116 are not at the symbol boundary of the symbol within which they are transmitted. This can allow the receiving node (e.g., base station 102) to decode the transmission part 1112 based on the CP 1116 by shifting FFT window to the resources within the symbol at which the transmission part 1112 is transmitted.

In method 400, optionally at Block 412, a DMRS can be transmitted for each of the multiple transmission parts, including at least one of the multiple transmission parts that crosses a symbol boundary. In an aspect, UE communicating component 242, e.g., in conjunction with processor(s) 212, memory 216, transceiver 202, etc., can transmit a DMRS for each of the multiple transmission parts, including at least one of the multiple transmission parts that crosses the symbol boundary. For example, referring again to FIG. 11, UE communicating component 242 can transmit a first DMRS for the first portion 1112 of the transmission part 2, and a second DMRS for the second portion 1114 of transmission part 2 to allow the receiving node (e.g., base station 102) to demodulate both portions based on associated DMRSs.

In method 500, optionally at Block 510, a DMRS can be received for each of the multiple transmission parts, including at least one of the multiple transmission parts that crosses a symbol boundary. In an aspect, BS communicating component 342, e.g., in conjunction with processor(s) 312, memory 316, transceiver 302, etc., can receive a DMRS for each of the multiple transmission parts, including at least one of the multiple transmission parts that crosses the symbol boundary. In this example, BS communicating component 342 can demodulate multiple portions of a transmission part based on associated DMRS.

In method 400, optionally at Block 414, a configuration indicating one or more parameters regarding the beam hopping pattern can be received. In an aspect, scheduling component 252, e.g., in conjunction with processor(s) 212, memory 216, transceiver 202, UE communicating component 242, etc., can receive a configuration indicating one or more parameters regarding the beam hopping pattern. For example, the configuration can include one or more configurations that may be received (e.g., from the base station 102) in radio resource control (RRC) signaling, MAC-CE, downlink control information (DCI) signaling, etc., retrieved from memory 216, etc. For example, as described, one or more configurations can include one or more parameters indicating, or related to determining, transmission part length, beam switching gap length, number of transmission parts and/or beam switching gaps per symbol, number of symbols and/or transmission parts per beam hop, beams to use for each beam hop, etc. Scheduling component 252 can schedule the transmissions in the multiple time periods and/or over multiple transmission parts based on the configuration.

In method 500, optionally at Block 512, a configuration indicating one or more parameters regarding the beam hopping pattern can be transmitted. In an aspect, configuring component 352, e.g., in conjunction with processor(s) 312, memory 316, transceiver 302, BS communicating component 342, etc., can transmit a configuration indicating one or more parameters regarding the beam hopping pattern. For example, the configuration can include one or more configurations that may be transmitted (to the UE 104) in RRC signaling, MAC-CE, DCI signaling, etc. For example, as described, one or more configurations can include one or more parameters indicating, or related to determining, transmission part length, beam switching gap length, number of transmission parts and/or beam switching gaps per symbol, number of symbols and/or transmission parts per beam hop, beams to use for each beam hop, etc. BS communicating component 342 can receive the transmissions in the multiple time periods and/or over multiple transmission parts based on the configuration.

In method 400, optionally at Block 416, a configuration indicating one or more parameters regarding the beam hopping pattern can be transmitted. In an aspect, scheduling component 252, e.g., in conjunction with processor(s) 212, memory 216, transceiver 202, UE communicating component 242, etc., can transmit a configuration indicating one or more parameters regarding the beam hopping pattern. For example, scheduling component 252 can transmit the configuration including parameters determined by the scheduling component 252 for transmitting the beams, which can include one or more of the parameters described above, or can include a UE capability to support certain features of beam hopping, such as certain transmission part lengths or crossing of symbol boundaries, certain beam switch gap lengths, etc. In one example, scheduling component 252 can transmit the configuration to a receiving node using PUCCH, physical uplink shared channel (PUSCH), or other uplink signaling. The receiving node may use this configuration to determine additional configuration parameters, which may be transmitted back to the UE 104, in one example.

In method 500, optionally at Block 514, a configuration indicating one or more parameters regarding the beam hopping pattern can be received. In an aspect, configuring component 352, e.g., in conjunction with processor(s) 312, memory 316, transceiver 302, BS communicating component 342, etc., can receive a configuration indicating one or more parameters regarding the beam hopping pattern. For example, configuring component 352 can receive the configuration including parameters determined by the UE 104 for transmitting the beams, which can include one or more of the parameters described above, or can include a UE capability to support certain features of beam hopping, such as certain transmission part lengths or crossing of symbol boundaries, certain beam switch gap lengths, etc. In one example, configuring component 352 can receive the configuration from the UE 104 using PUCCH, PUSCH, or other uplink signaling. Configuring component 352 may use this configuration to determine additional configuration parameters, which may be transmitted back to the UE 104, in one example.

In this regard, in an example, the pair of beams that UE 104 and/or base station 102 hop over can be determined based on which directions (e.g., spatial directions of the beams) provide good signal strength and/or low interference. For example, this information can be provided by the base station 102 to the UE 104 over the downlink (e.g., in a configuration as described above), and/or by the UE 104 to the base station 102 over the uplink based (e.g., in a configuration as described above) on previous measurements. For example, the previous measurements may be performed by the base station 102 or UE 104 to determine the beam or beam pair to be used. In one example, the measurements can be reported, e.g., instead of or in addition to the beams to use, to allow the base station 102 and/or UE 104 to determine the beams. In another example, the measurements or determined beams to use may be aggregated across UEs close to the UE 104 over sidelink who see a similar environment (and thus transmitting or receiving the configuration described above can include this communication of measurements or determined beams among UEs). In one example, choice of beam hopping can be cell-based, such that, for example, neighboring cells can choose beams based on their unique cell ID in a manner that reduces interference in the uplink. Neighboring cells may also choose beams jointly to reduce inter-cell interference. In this example, transmitting or receiving configurations, as described above, may at least partially include communicating measurements or related beams to use among the neighboring cells to allow for such jointly choosing beams.

In addition, for example, the configuration(s) can include an indication of beam hopping, which can be part of a PUCCH Resource Config information element (IE) inside a PUCCH Resource Set. The PUCCH Resource Config IE can include other parameters of PUCCH (such as format, length, frequency hopping etc.). The beam hopping indication, which may be configured in the PUCCH Resource Config IE by a base station 102, can also indicate the number of PUCCH symbols and/or the number of PUCCH parts per beam-hop. In an example, this number may be implicitly derived based on the length, format or type of PUCCH (e.g., based on how number of symbols per frequency hop are derived currently). In another example, this number may be indicated via bits in the PUCCH Resource Config IE. For example, the length of PUCCH may be indicated using a combination of number of symbols and number (and length) of transmission parts. In this example, the length of the transmission part can indicate the additional length of PUCCH beyond the number of symbols configured. For example, PUCCH Resource Config IE may include an indication of a number of symbols in a transmission, a number of transmission parts in the transmission, and a length of each transmission part, which can be used to derive the length of the transmission. In yet another example, the PUCCH Resource Config IE may include an indication of whether to use the same PUCCH parameters (e.g., number of symbols, number of transmission parts, and transmission part length) for a second and/or one or more subsequent hops.

In addition, for example, the indication may also indicate the beam switching gap between the one or more beam hops In an example, the beam switching gap, or associated indication, can be based on UE capability and/or agreed between the base station 102 and UE 104 based on prior information exchange, or indicated to the UE based on UE type (e.g., Redcap or normal UE). In another example, the beams to hop across can be indicated by the base station 102 as well. For example, the base station 102 may indicate the beams to hop across by, or based on, specifying a quasi-colocation (QCL) source, such as a CSI-RS, DMRS, SSB or sounding reference signal (SRS) over which a previous beamformed transmission has taken place, or by specifying (e.g., indicating or activating) beams from a common table of beams. In either case, for example, the base station 102 may not specify this for every PUCCH, but can indicate only when the beam is to change. Indication can be done again via PUCCH Resource Config or through DCI/MAC-CE/RRC, etc.

In the above examples, UE 104 can receive and/or transmit one or more configurations, or base station 102 can transmit and/or receive one or more configurations, as described above, to communicate the parameters. UE 104 and/or base station 102 can accordingly determining beam hopping information for the transmissions, transmission part information, beam switching gap information, etc., from the configurations for transmitting and/or receiving the transmissions using the beam hopping pattern.

Figure 13:
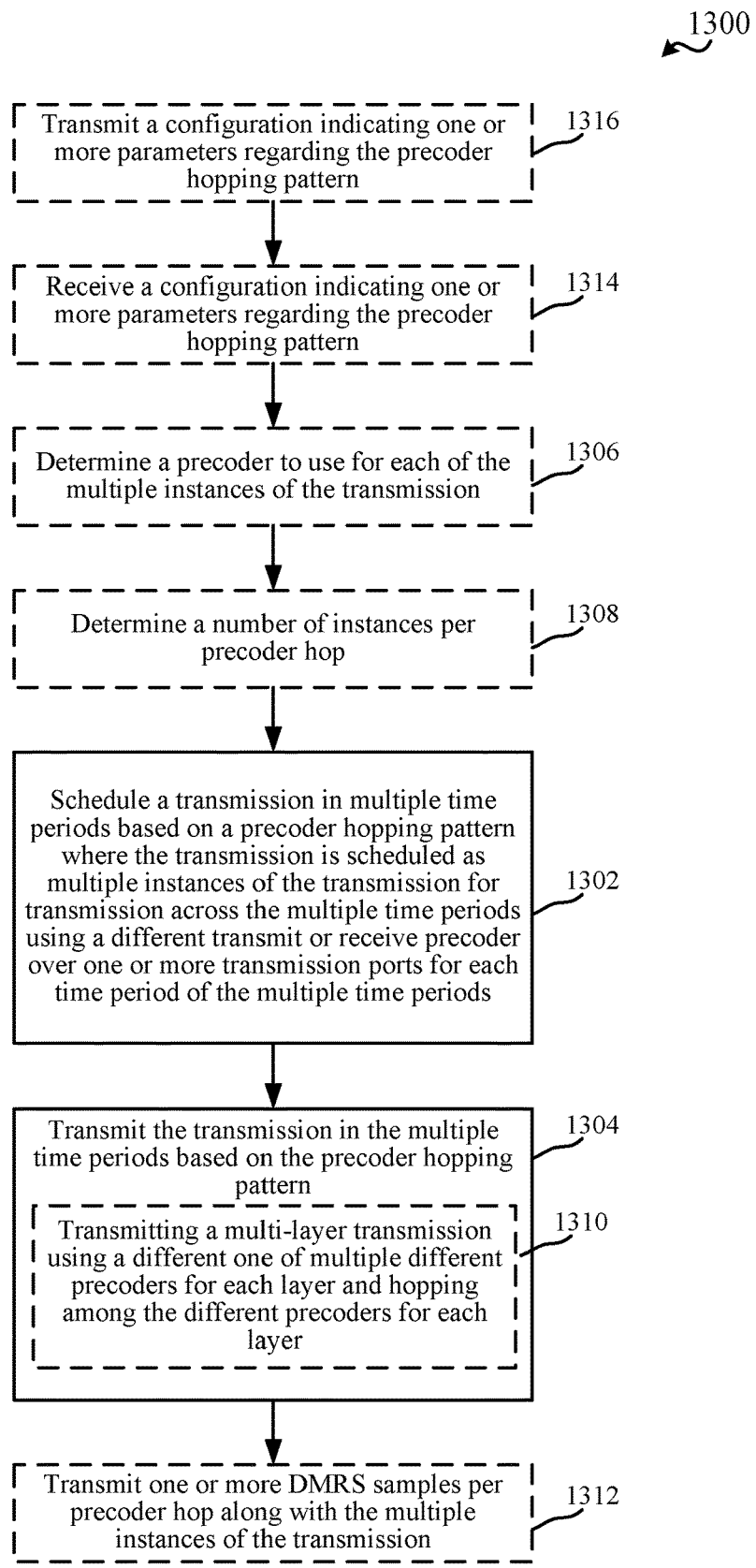
FIG. 13 illustrates a flow chart of an example of a method for scheduling transmissions based on a precoder hopping pattern, in accordance with aspects described herein.
Figure 14:
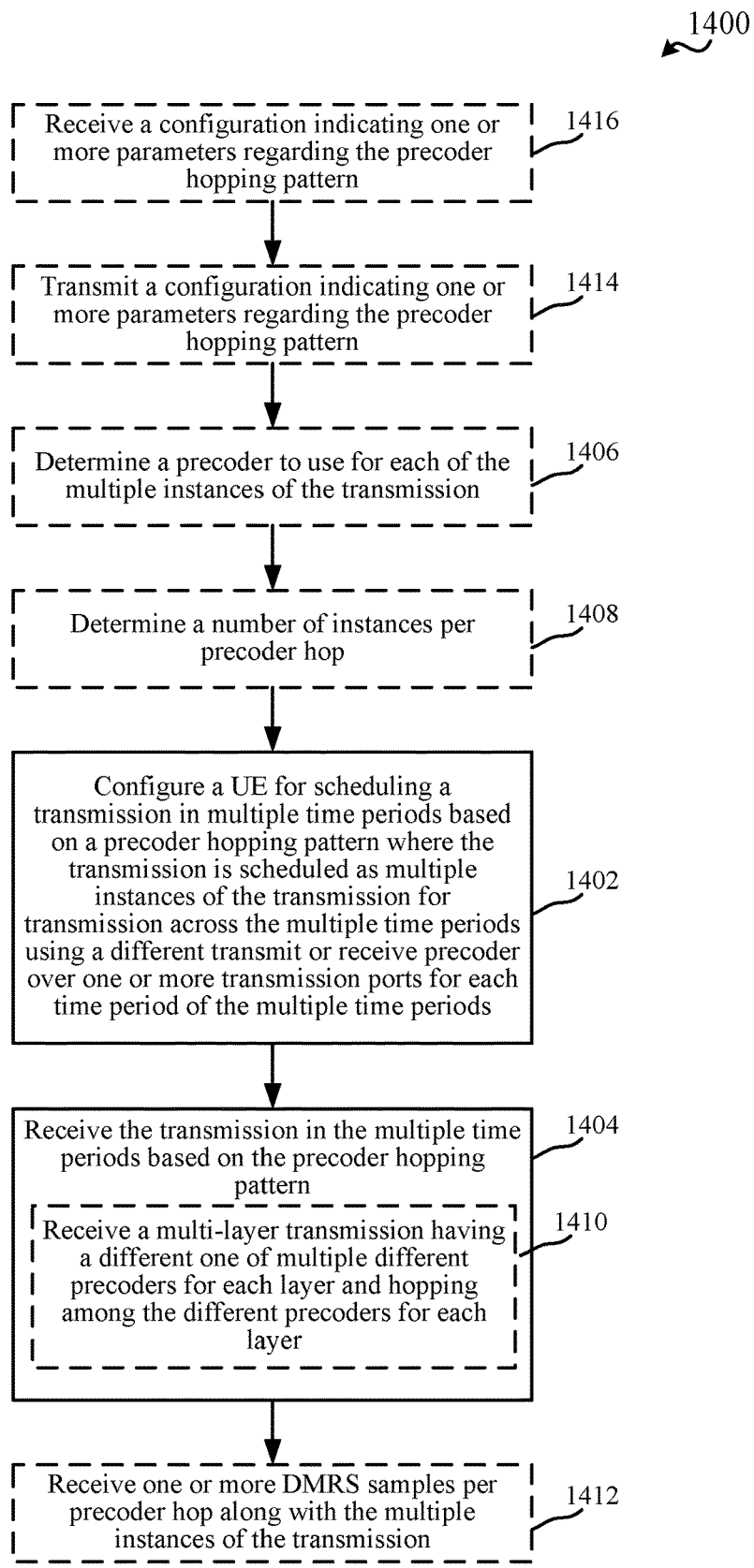
FIG. 14 illustrates a flow chart of an example of a method for receiving transmissions based on a precoder hopping pattern, in accordance with aspects described herein.

FIG. 13 illustrates a flow chart of an example of a method 1300 for scheduling transmissions based on a precoder hopping pattern, in accordance with aspects described herein. FIG. 14 illustrates a flow chart of an example of a method 1400 for receiving transmissions based on a precoder hopping pattern, in accordance with aspects described herein. Methods 1300 and 1400 are described in conjunction with one another below simply for ease of explanation, though the methods are not required to be performed in conjunction with one another, and indeed different nodes can perform either of method 1300 or 1400. In an example, a UE 104 or other transmitting node (e.g., a sidelink transmitting UE) can perform the functions described in method 1300 using one or more of the components described in FIGS. 1 and 2, and a base station 102 or other node receiving communications from a UE (e.g., a sidelink receiving UE) can perform the functions described in method 1400 using one or more of the components described in FIGS. 1 and 3.

In method 1300, at Block 1302, a transmission can be scheduled in multiple time periods based on a precoder hopping pattern where the transmission is scheduled as multiple transmission instances of the transmission for transmission across the multiple time periods using a different transmit or receive precoder over one or more transmission ports for each time period of the multiple time periods. In an aspect, scheduling component 252, e.g., in conjunction with processor(s) 212, memory 216, transceiver 202, UE communicating component 242, etc., can schedule the transmission in multiple time periods based on the precoder hopping pattern where the transmission is scheduled as multiple transmission instances of the transmission for transmission across the multiple time periods using a different transmit or receive precoder over one or more transmission ports for each time period of the multiple time periods. For example, scheduling component 252 can schedule the transmission as the multiple transmission instances such to use a different precoder to transmit the transmission in one or more transmission instances. For example, scheduling component 252 can select the precoder from precoders configured for using by the UE 104. An example is shown in FIG. 15.

Figure 15:
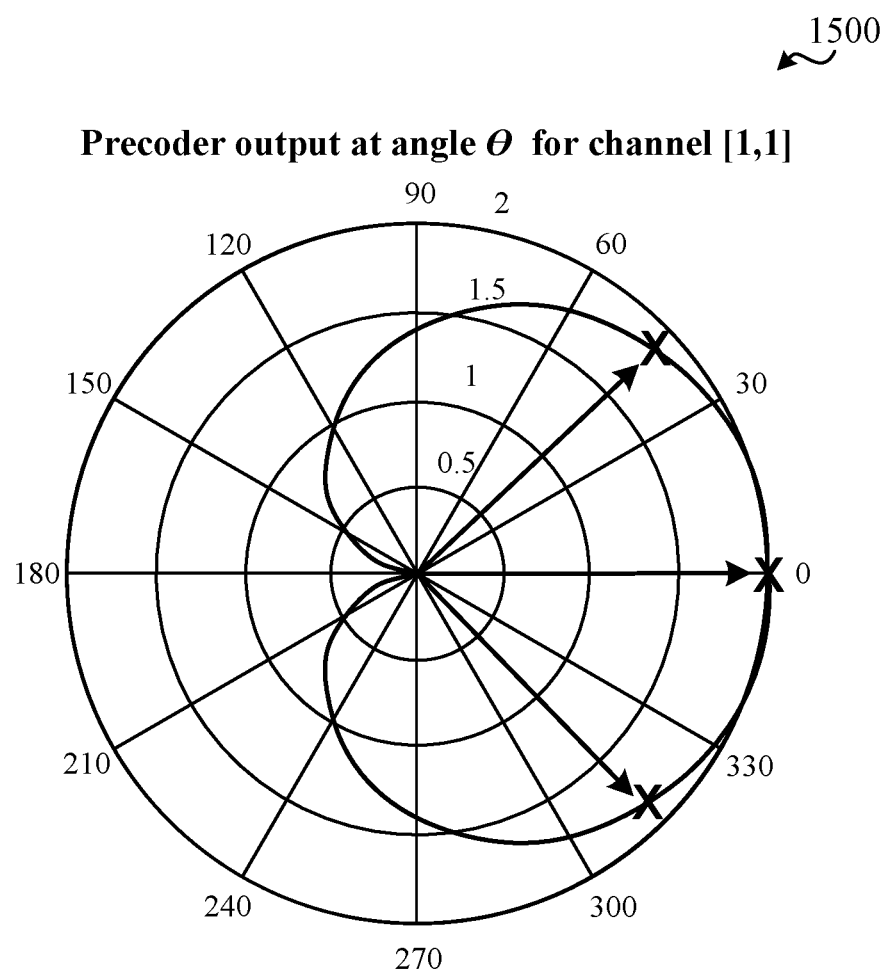
FIG. 15 illustrates an example of different precoder outputs at different angles for a channel, in accordance with aspects described herein.

FIG. 15 illustrates an example of different precoder outputs at different angles for a channel 1500. In this example, scheduling component 252 can select different precoder outputs or angles, or combinations of precoders, to achieve transmit diversity. In particular, for example, precoder hopping can provide the capability to average across cross-cell interference, potential intra-cell inter-user interference, and/or also achieve a better SNR in the uplink by combining the transmissions on two different precoders to form a better precoder. Another example is shown in FIG. 16.

Figure 16:
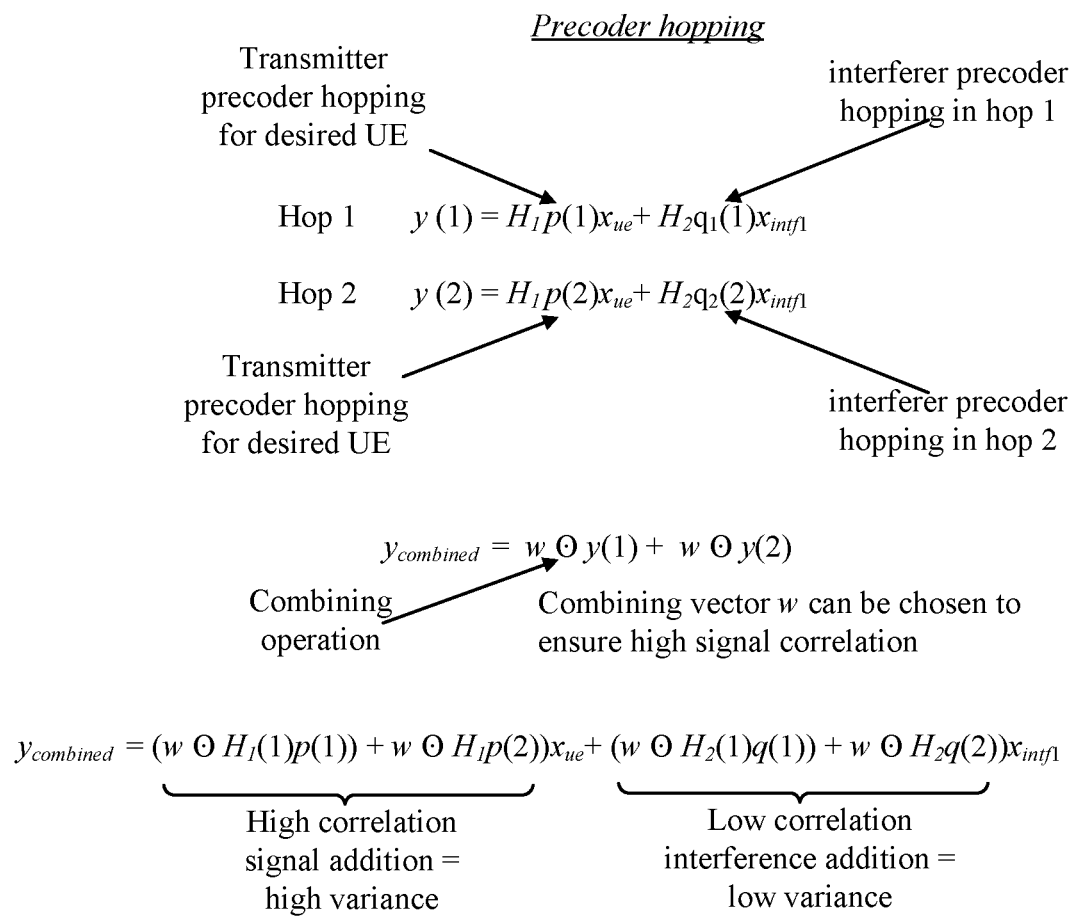
FIG. 16 illustrates an example of a formula for selecting different precoders per hop, where the precoder can be selected by varying parameters of the formula, in accordance with aspects described herein.

FIG. 16 illustrates an example of a formula 1600 for selecting different precoders per hop, where the precoder can be selected by varying parameters of the formula 1600, including the precoder ($p_1,p_2$) and/or interference precoder ($q_1$, $q_2$). In an example, selecting the precoder can include applying different weights to different precoders (e.g., precoder ($p_1,p_2$) and/or interference precoder ($q_1$, $q_2$)) to achieve a certain precoder to use in precoder hopping. For example, precoder hopping can provide the capability to average across cross-cell interference, potential intra-cell inter-user interference, and also achieve a better SNR in the uplink by combining the transmissions on two different precoders to form a better precoder.

In method 1300, at Block 1304, the transmission can be transmitted in the multiple time periods based on the precoder hopping pattern. In an aspect, UE communicating component 242, e.g., in conjunction with processor(s) 212, memory 216, transceiver 202, etc., can transmit the transmission in the multiple time periods based on the precoder hopping pattern. For example, UE communicating component 242 can transmit the transmission in a first instance (e.g., in a first symbol or slot or transmission part) using a first precoder, transmit the same transmission in a second instance (e.g., in a second or next symbol or slot or transmission part) using a second precoder different from the first precoder (and/or using a different beam), etc., as described above and further herein. As described, for example, a base station 102 or other node (e.g., SL receiving UE) can configure the UE 104 to transmit the transmissions using precoder hopping.

In method 1400, at Block 1402, a UE can be configured for scheduling a transmission in multiple time periods based on a precoder hopping pattern where the transmission is scheduled as multiple transmission instances of the uplink transmission for transmission across the multiple time periods using a different transmit or receive precoder over one or more transmission ports for each time period of the multiple time periods. In an aspect, configuring component 352, e.g., in conjunction with processor(s) 312, memory 316, transceiver 302, BS communicating component 342, etc., can configure the UE (e.g., UE 104) for scheduling the transmission in multiple time periods based on the precoder hopping pattern where the transmission is scheduled as multiple transmission instances of the uplink transmission for transmission across the multiple time periods using a different transmit or receive precoder over one or more transmission ports for each time period of the multiple time periods. For example, configuring component 352 can configure the UE with information on precoders to use for each instance of transmitting the transmission or other parameters related to determining the precoders, etc.

In one example, configuring component 352 can configure the UE 104 to hop transmit precoder within a multi-port PUCCH transmission. A transmit precoder can be applied whenever multiple ports or RF chains are available for transmission. With a transmit and receive precoder, beamforming gain can be achieved or more streams can be sent or a combination of both. Precoding is digital while beamforming is analog. Both are independent processes that can be simultaneously applied, in one example. An example is shown in FIG. 17.

Figure 17:
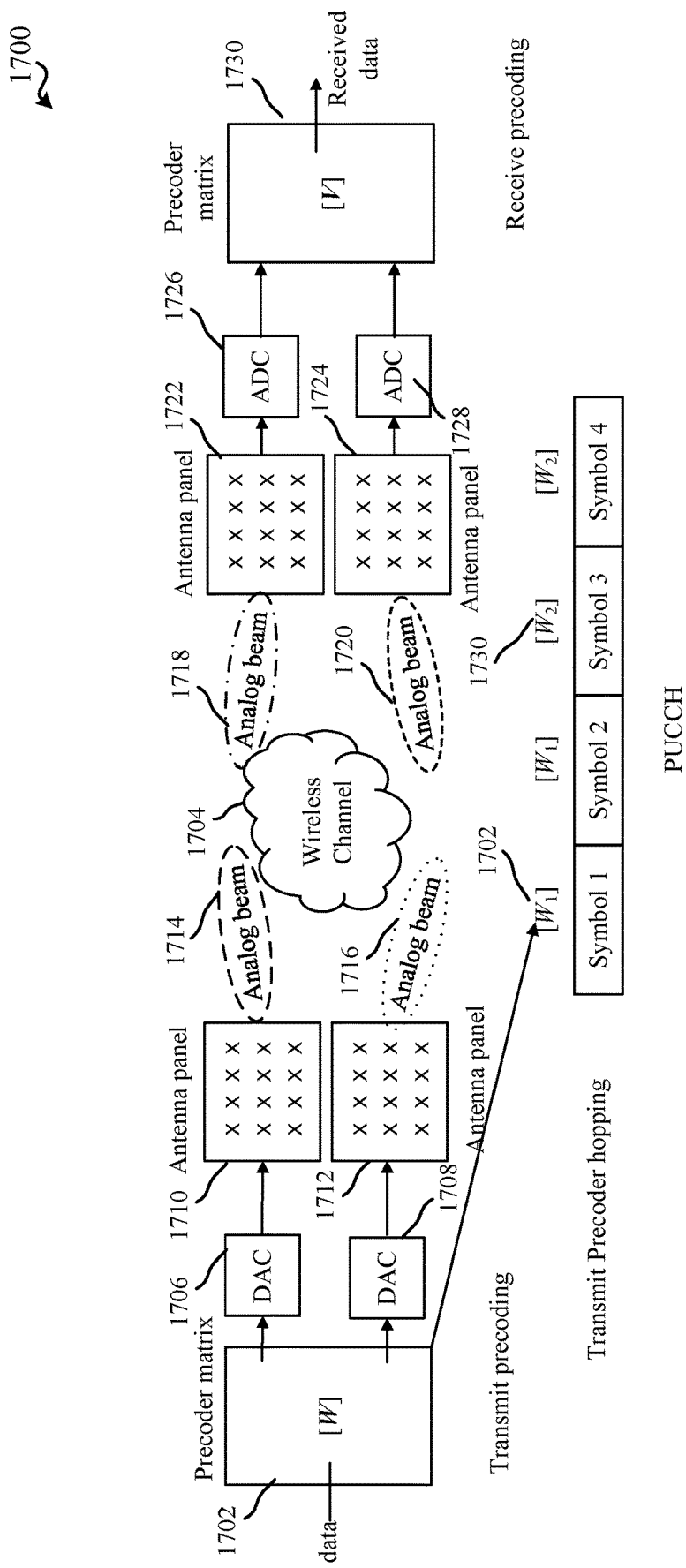
FIG. 17 illustrates an example of a communication process between a transmitting node and receiving node, in accordance with aspects described herein.

FIG. 17 illustrates an example of a communication process 1700 between a transmitting node and receiving node. The transmitting node can use transmit precoder matrix 1702 to precode the transmission for transmitting over a wireless channel 1704. In an example, the transmitting node can convert the precoded transmission to an analog signal using digital-to-analog converter (DAC) 1706 and 1708 for respective antenna panels 1710 and 1712. The antenna panels 1710 and 1712 can form respective analog beams 1714 and 1716 for transmitting the precoded transmission over wireless channel 1704. The receiving node can form analog beams 1718 and 1720 using respective antenna panels 1722 and 1724 to receive the precoded transmission. The receiving node can also convert the analog signals received for the precoded transmission to digital using respective analog-to-digital converter (ADC) 1726 and 1728. The receiving node can apply a receive precoder matrix 1730, which can be similar to the transmit precoder matrix 1702, to decode the received data.

In communication process 1700, transmit precoder matrix 1702 (and/or receive precoder matrix 1730) can be used for transmitting PUCCH in symbols 1 and 2. The transmitting node can then hop to transmit precoder matrix 1730 (and/or the receiving node can hop to an associated receive precoder matrix) for transmitting the PUCCH in symbols 3 and 4.

In method 500, at Block 504, the transmission can be received in the multiple time periods based on the precoder hopping pattern. In an aspect, BS communicating component 342, e.g., in conjunction with processor(s) 312, memory 316, transceiver 302, etc., can receive the transmission in the multiple time periods based on the precoder hopping pattern. For example, BS communicating component 342 can also precoder hop its receive precoder to receive the transmission in a first instance (e.g., a first symbol or slot or transmission part) using a first receive precoder, receive the transmission in a second instance (e.g., a second symbol or slot or transmission part) using a second precoder different from the first precoder (and/or a second beam), etc.

In method 1300, optionally at Block 1306, a precoder to use for each of the multiple instances of the transmission can be determined. In an aspect, scheduling component 252, e.g., in conjunction with processor(s) 212, memory 216, transceiver 202, UE communicating component 242, etc., can determine the precoder to use for each of the multiple instances of the transmission. For example, scheduling component 252 can determine the precoder to use based on a precoder hardcoded in a memory 216 of the UE 104 (e.g., based on a wireless communication technology standard). In another example, scheduling component 252 can receive an indication of the precoder to use in a configuration (e.g., from the base station 102, SL UE, etc.). In another example, scheduling component 252 can determine the precoder to use based on other parameters, which UE 104 may report to the base station 102. In any case, scheduling component 252 can schedule the transmission in the transmission instances to be transmitted using the received or otherwise determined transmit precoders. In another example, scheduling component 252 can determine the precoder to use based on determining which precoder(s) maximize diversity of a desired signal at a receiver node or to reduce interference.

In method 1400, optionally at Block 1406, a precoder to use for each of the multiple instances of the uplink transmission can be determined. In an aspect, configuring component 352, e.g., in conjunction with processor(s) 312, memory 316, transceiver 302, BS communicating component 342, etc., can determine a precoder to use for each of the multiple instances of the uplink transmission. For example, configuring component 352 can determine the precoder to use based on a precoder hardcoded in a memory 316 of the BS 102 (e.g., based on a wireless communication technology standard). In another example, configuring component 352 can transmit an indication of the precoder to use in a configuration (e.g., to the UE 104). In another example, scheduling component 252 can determine the precoder to use based on a UE capability, which UE 104 may report to the base station 102. In any case, BS communicating component 342 can receive the transmission based on the determined receive precoders.

In method 1300, optionally at Block 1308, a number of instances per precoder hop can be determined. In an aspect, scheduling component 252, e.g., in conjunction with processor(s) 212, memory 216, transceiver 202, UE communicating component 242, etc., can determine the number of instances (e.g., number of symbols, slots, transmission parts, etc.) per precoder hop. For example, scheduling component 252 can determine the number of instances per precoder hop based on a number of instances per precoder hop hardcoded in a memory 216 of the UE 104 (e.g., based on a wireless communication technology standard). In another example, scheduling component 252 can receive an indication of the number of instances per precoder hop in a configuration (e.g., from the base station 102, SL UE, etc.). In another example, scheduling component 252 can determine the number of instances per precoder hop based on a UE capability, which UE 104 may report to the base station 102. In any case, scheduling component 252 can schedule the transmissions over the multiple instances and based on the precoder hopping according to the determined number of instances per precoder hop.

In method 1400, optionally at Block 1408, a number of instances per precoder hop can be determined. In an aspect, configuring component 352, e.g., in conjunction with processor(s) 312, memory 316, transceiver 302, BS communicating component 342, etc., can determine the number of instances (e.g., number of symbols, slots, transmission parts, etc.) per precoder hop. For example, configuring component 352 can determine the number of instances per precoder hop based on a number of instances per precoder hop hardcoded in a memory 316 of the BS 102 (e.g., based on a wireless communication technology standard). In another example, configuring component 352 can transmit an indication of the number of instances per precoder hop in a configuration (e.g., to the UE 104). In another example, scheduling component 252 can determine the number of instances per precoder hop based on a UE capability, which UE 104 may report to the base station 102. In any case, BS communicating component 342 can receive the transmissions in the multiple instance and based on the precoder hopping according to the determined number of instance per precoder hop.

In transmitting the transmission at Block 1304, optionally at Block 1310, a multi-layer transmission can be transmitted using a different one of multiple different precoders for each layer and hopping among the different precoders for each layer. In an aspect, UE communicating component 242, e.g., in conjunction with processor(s) 212, memory 216, transceiver 202, etc., can transmit a multi-layer transmission using a different one of multiple different precoders for each layer and hopping among the different precoders for each layer. For example, UE communicating component 242 can use a first precoder for transmitting the transmission at a first layer and a second precoder for transmitting the transmission at a second layer. Then, the UE communicating component 242 can hop both precoders to use a third precoder for transmitting the transmission at a first layer after the precoder hop and a fourth precoder for transmitting the transmission at a second layer after the precoder hop. An example is shown in FIG. 18.

Figure 18:
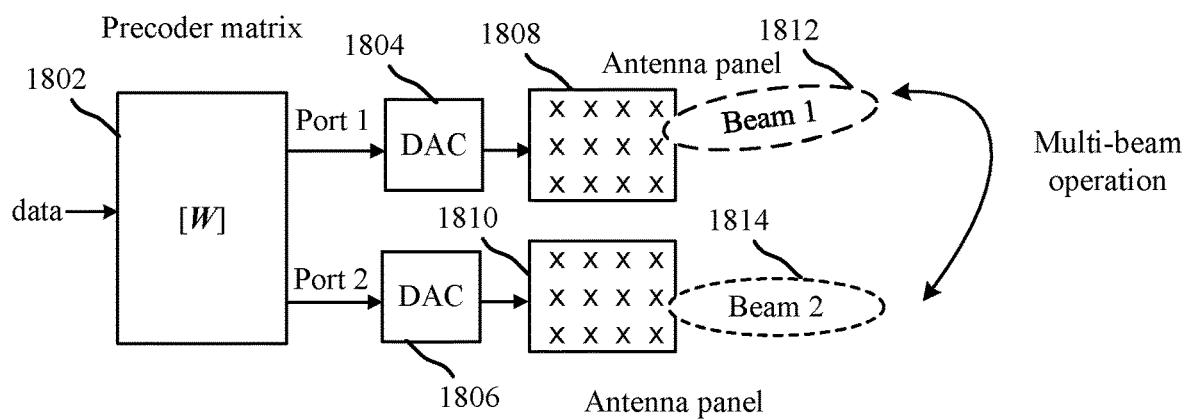
FIG. 18 illustrates an example of a communication process from a transmitting node, in accordance with aspects described herein.

FIG. 18 illustrates an example of a communication process 1800 from a transmitting node. The transmitting node can use transmit precoder matrix 1802 to precode the transmission for transmitting over a wireless channel. In an example, the transmitting node can convert the precoded transmission to an analog signal using DAC 1804 for an antenna port 1, and DAC 1806 for an antenna port 2. DAC 1804 can provide its analog signal to antenna panel 1808 for transmission, and DAC 1806 can provide its analog signal to antenna panel 1810 for transmission. The antenna panels 1808 and 1810 can form respective analog beams 1812 and 1814 for transmitting the precoded transmission over the wireless channel in a multi-beam operation.

In receiving the transmission at Block 1404, optionally at Block 1410, a multi-layer transmission can be received using a different one of multiple different precoders for each layer and hopping among the different precoders for each layer. In an aspect, BS communicating component 342, e.g., in conjunction with processor(s) 312, memory 316, transceiver 302, etc., can receive a multi-layer transmission using a different one of multiple different precoders for each layer and hopping among the different precoders for each layer.

In method 1300, optionally at Block 1312, one or more DMRS samples can be transmitted per precoder hop along with the multiple instances of the transmission. In an aspect, UE communicating component 242, e.g., in conjunction with processor(s) 212, memory 216, transceiver 202, etc., can transmit one or more DMRS samples per precoder hop along with the multiple instances of the transmission. For example, this can allow the receiving node (e.g., base station 102) to demodulate each of the multiple instances of the transmission.

In method 1400, optionally at Block 1412, one or more DMRS samples can be received per precoder hop along with the multiple instances of the uplink transmission. In an aspect, BS communicating component 342, e.g., in conjunction with processor(s) 312, memory 316, transceiver 302, etc., can receive one or more DMRS samples per precoder hop along with the multiple instances of the uplink transmission. In this example, BS communicating component 342 can demodulate multiple instances of the transmissions based on associated DMRS.

In method 1300, optionally at Block 1314, a configuration indicating one or more parameters regarding the precoder hopping pattern can be received. In an aspect, scheduling component 252, e.g., in conjunction with processor(s) 212, memory 216, transceiver 202, UE communicating component 242, etc., can receive a configuration indicating one or more parameters regarding the precoder hopping pattern. For example, the configuration can include one or more configurations that may be received (e.g., from the base station 102) in RRC signaling, MAC-CE, DCI signaling, etc., retrieved from memory 216, etc. For example, as described, one or more configurations can include one or more parameters indicating, or related to determining, precoders to use, a number of instances per precoder hop, etc. Scheduling component 252 can schedule the transmissions in the multiple time periods and/or over multiple instances using transmit precoders based on the configuration.

In method 1400, optionally at Block 1414, a configuration indicating one or more parameters regarding the precoder hopping pattern can be transmitted. In an aspect, configuring component 352, e.g., in conjunction with processor(s) 312, memory 316, transceiver 302, BS communicating component 342, etc., can transmit a configuration indicating one or more parameters regarding the precoder hopping pattern. For example, the configuration can include one or more configurations that may be transmitted (to the UE 104) in RRC signaling, MAC-CE, DCI signaling, etc. For example, as described, one or more configurations can include one or more parameters indicating, or related to determining, precoders to use, a number of instances per precoder hop, etc. BS communicating component 342 can receive the transmissions in the multiple time periods and/or over multiple instances using receive precoders based on the configuration.

In method 1300, optionally at Block 1316, a configuration indicating one or more parameters regarding the precoder hopping pattern can be transmitted. In an aspect, scheduling component 252, e.g., in conjunction with processor(s) 212, memory 216, transceiver 202, UE communicating component 242, etc., can transmit a configuration indicating one or more parameters regarding the precoder hopping pattern. For example, scheduling component 252 can transmit the configuration including parameters determined by the scheduling component 252 for transmitting the transmissions based on multiple precoders, which can include one or more of the parameters described above, or can include a UE capability to support certain features of precoder hopping, such as precoders that can be used, etc. In one example, scheduling component 252 can transmit the configuration to a receiving node using RRC signaling, or other uplink signaling. The receiving node may use this configuration to determine additional configuration parameters, which may be transmitted back to the UE 104, in one example.

In method 1400, optionally at Block 1416, a configuration indicating one or more parameters regarding the precoder hopping pattern can be received. In an aspect, configuring component 352, e.g., in conjunction with processor(s) 312, memory 316, transceiver 302, BS communicating component 342, etc., can receive a configuration indicating one or more parameters regarding the precoder hopping pattern. For example, configuring component 352 can receive the configuration including parameters determined by the UE 104 for transmitting the transmissions based on multiple precoders, which can include one or more of the parameters described above, or can include a UE capability to support certain features of precoder hopping, such as precoders that can be used, etc. In one example, configuring component 352 can receive the configuration from the UE 104 using RRC signaling, or other uplink signaling. Configuring component 352 may use this configuration to determine additional configuration parameters, which may be transmitted back to the UE 104, in one example.

In this regard, in an example, the transmit precoders to be hopped over can be indicated by the base station 102, or a priori agreed between UE 104 and base station 102. If indicated, the precoder indication can refer to a common codebook or spatial relationships with another precoded transmission such as DMRS, CSI-RS, PUSCH, PDSCH, SRS etc. In this example, the same precoders as used on these signals/channels can be chosen to transmit PUCCH. In an example, as described above, receive precoders at the base station 102 can also accordingly hop (to ensure good signal quality). It is also possible that base station 102 gives UE 104 the flexibility to choose the precoders (as many types of PUCCH have accompanying DMRS for channel estimation). Like beam hopping, the parameters and indication of precoder hopping may be included in PUCCH Resource Config IE as part of PUCCH Resource Set, as described above. In this example, the PUCCH Resource Config IE can include a number of transmission parts and/or symbols per precoder hop, as described above, which can be either implicitly derived based on length, format, type of PUCCH or explicitly specified via bits. In addition, in this example, each precoder hop may have some DMRS samples to enable channel estimation on that precoder, as described above, unless the receive precoder is already known to the receiver. In another example, multi-layer precoders can be indicated for multi-layer transmissions where each layer precoder is hopping according to the configuration indicated by the base station 102, as described.

In another example, scheduling component 252 and/or configuring component 352 can simultaneously configure precoder hopping and beam hopping. In this example, there may be one or more beam hops within a precoder hop, or one or more precoder hops within a beam hop. The configuration transmitted or received by the UE 104 or base station 102 can configure various parameters to achieve the simultaneous precoder and beam hopping. In yet another example, for a multi-port PUCCH, different beams can be transmitted at the same time, from separate ports, giving the diversity benefit of multi-beam operation but without extra time overhead, as described above.

Figure 19:
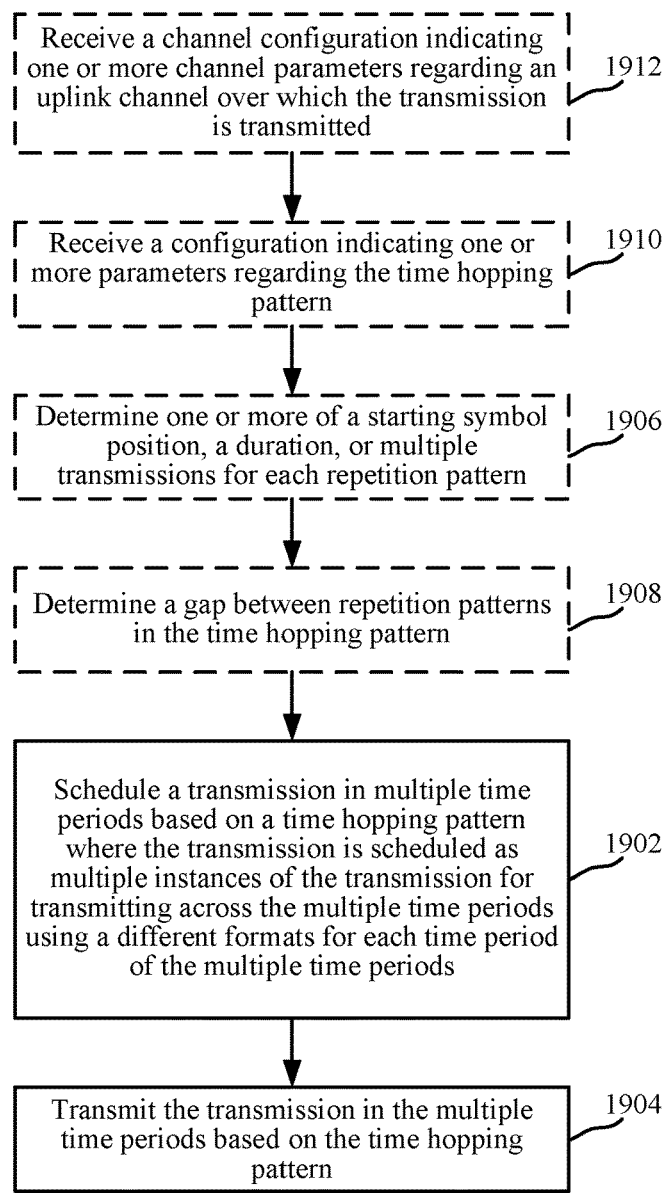
FIG. 19 illustrates a flow chart of an example of a method for scheduling transmissions based on a time hopping pattern, in accordance with aspects described herein.
Figure 20:
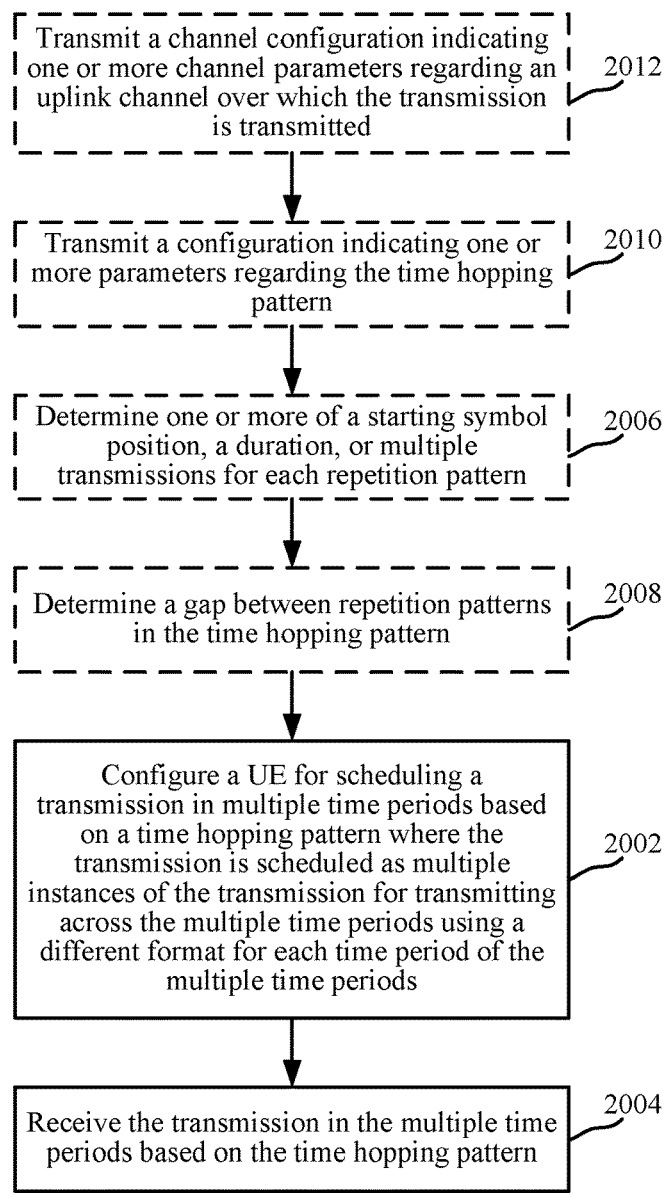
FIG. 20 illustrates a flow chart of an example of a method for receiving transmissions based on a time hopping pattern, in accordance with aspects described herein.

FIG. 19 illustrates a flow chart of an example of a method 1900 for scheduling transmissions based on a time hopping pattern, in accordance with aspects described herein. FIG. 20 illustrates a flow chart of an example of a method 2000 for receiving transmissions based on a time hopping pattern, in accordance with aspects described herein. Methods 1900 and 2000 are described in conjunction with one another below simply for ease of explanation, though the methods are not required to be performed in conjunction with one another, and indeed different nodes can perform either of method 1900 or 2000. In an example, a UE 104 or other transmitting node (e.g., a sidelink transmitting UE) can perform the functions described in method 1900 using one or more of the components described in FIGS. 1 and 2, and a base station 102 or other node receiving communications from a UE (e.g., a sidelink receiving UE) can perform the functions described in method 2000 using one or more of the components described in FIGS. 1 and 3.

In method 1900, at Block 1902, a transmission can be scheduled in multiple time periods based on a time hopping pattern where the transmission is scheduled as multiple instances of the transmission for tranmisting across the multiple time periods using a different format for each time period of the multiple time periods. In an aspect, scheduling component 252, e.g., in conjunction with processor(s) 212, memory 216, transceiver 202, UE communicating component 242, etc., can schedule the transmission in multiple time periods based on the time hopping pattern where the transmission is scheduled as multiple instances of the transmission for transmitting across the multiple time periods using a different format for each time period of the multiple time periods. In one example, the different formats can include different repetitions patterns of symbol locations in each time period, different transmission powers for the multiple instances of the transmission, different coding rates for the multiple instances of the transmission, a different number of reference samples for each of the multiple instances of the transmission, a different sequence or sequence root for each of the multiple instances of the transmission, a different cyclic shift of the uplink channel for each of the multiple instances of the transmission, etc. In one example, the different formats can include or can be defined with parameters different from those defined for PUCCH formats in 5G NR Release 16.

For example, scheduling component 252 can schedule the transmission as the multiple transmission instances such to use a same or different repetition pattern of symbol locations to transmit the transmission in each of the multiple transmission instances. For example, scheduling component 252 can select the repetitions pattern from repetitions pattern configured for using by the UE 104. Using different repetition patterns in different time periods may improve wireless channel amplitude for one or more of the transmissions. An example is shown in FIG. 21.

Figure 21:
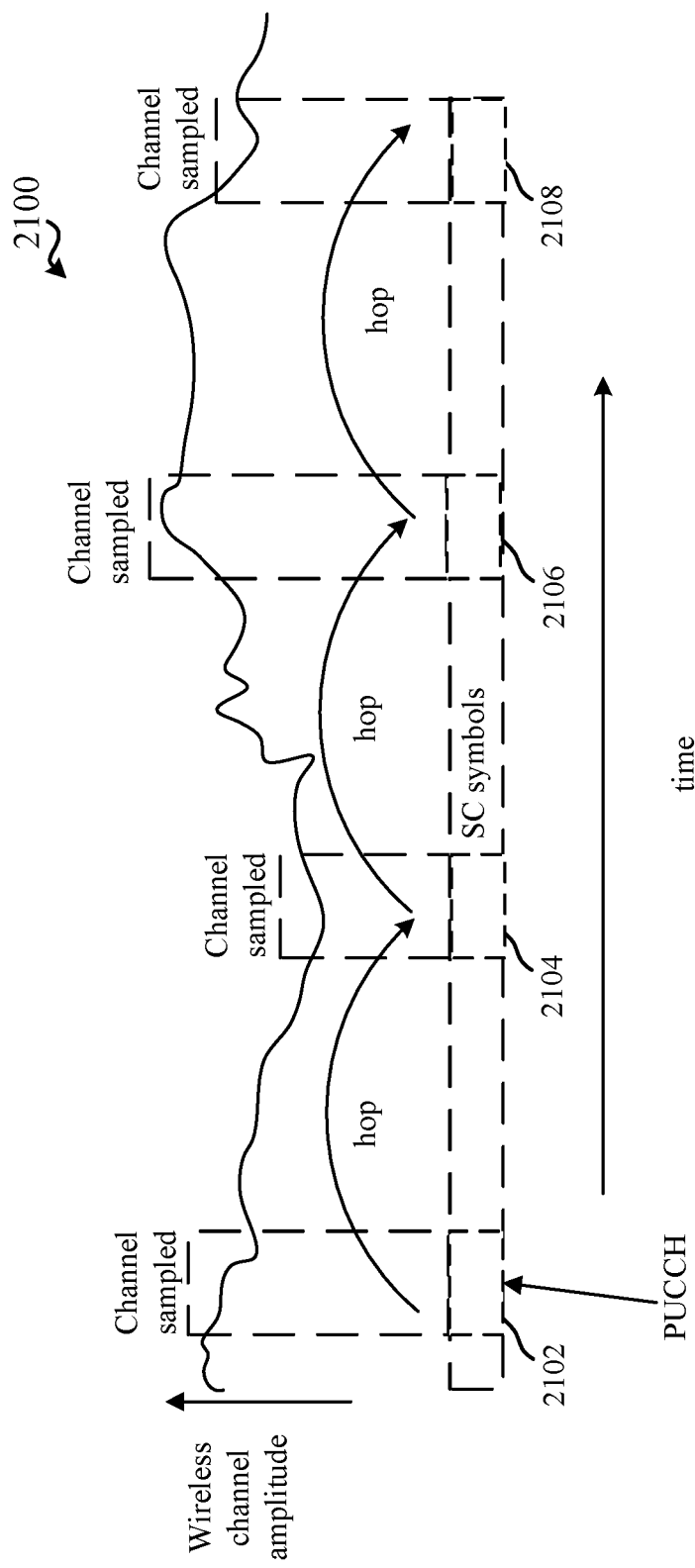
FIG. 21 illustrates an example of a timeline over which a transmission can be transmitted in single carrier symbols according to different repetition patterns, in accordance with aspects described herein.

FIG. 21 illustrates an example of a timeline 2100 over which a PUCCH can be transmitted in SC symbols according to different repetition patterns at each of 2102, 2104, 2106, and 2108 (e.g., with a time gap in between). Using the different repetitions patterns allows for variation of wireless channel amplitude of the sampled channel, which can provide transmit diversity for PUCCH.

Figure 22:
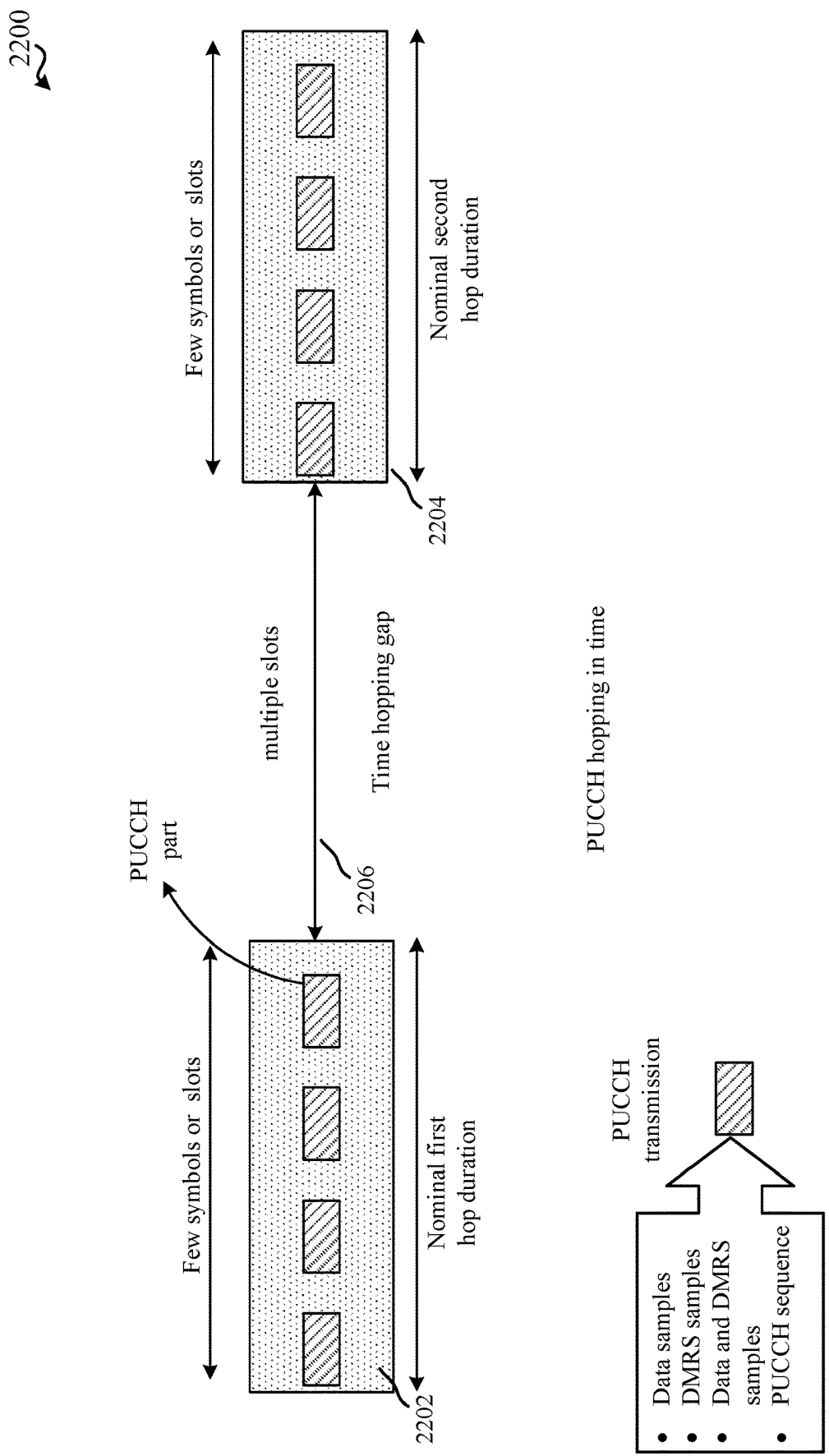
FIG. 22 illustrates an example of a timeline for transmitting multiple repetition patterns of transmission, in accordance with aspects described herein.

FIG. 22 illustrates an example of a timeline 2200 for transmitting multiple repetition patterns of PUCCH. In timeline 2200, a first repetition pattern 2202 and second repetition pattern 2204 are shown for transmitting multiple PUCCH transmissions in a nominal hop duration of a collection of symbols and/or slots. The first repetition pattern 2202 and second repetition pattern 2204 may have a same or different nominal hop duration. As shown, the PUCCH transmissions in the first repetition pattern 2202 may have a different starting location within the nominal hop duration than the second repetition pattern 2204 (e.g., a different starting symbol index), and/or may have a different number of symbols or slots or transmission parts between PUCCH transmissions. In addition, in an example, the first repetition pattern 2202 and the second repetition pattern may be separated by a time hopping gap 2206. For example, time hopping gaps, such as time hopping gap 2206, can be used to provide diversity across channel coherence time while nominal hop duration can be used to randomize interference.

For example, having repetition for PUCCH that are more than a channel coherence interval apart can increase diversity, and time hopping across channel coherence intervals can be used in this regard. For example, to calculate how much gap can be used to get time diversity at higher frequencies, where speed v=22.5 miles/hour(hr)=36 kilometers (km)/hr=10 m/sec, carrier frequency Fc=140 GHz, bandwidth (BW)=16 GHz, sample duration=1/16 ns. Symbol size=4096 samples, symbol duration=256 ns. In this example, Doppler=v*Fc/c=10*140*10/\9/(3*10/\8) =4666.66 Hz. Coherence time ~=0.5/Doppler=107.14 microseconds (usec). Assuming only the channel is varying, to get time diversity, the time hopping can interleave across 107140/256=418.52 symbols=29.9 slots. Thus, a large time gap of multiple slots can be used to achieve diversity. In this regard, for example, PUCCH can be transmitted in slots that are separated by a gap that is multiple slots in length and decided by, or based on, the channel coherence time. Starting position of PUCCH transmissions in these slots is configurable as well. While the large gap allows to achieve time diversity through repetition, randomized starting location in symbol can avoid inter-cell interference.

In timeline 2200, a first repetition pattern 2202 and second repetition pattern 2204 are shown for transmitting multiple PUCCH transmissions in a nominal hop duration of a collection of symbols and/or slots. The first repetition pattern 2202 and second repetition pattern 2204 may have a same or different nominal hop duration. As shown, the PUCCH transmissions in the first repetition pattern 2202 may have a different starting location within the nominal hop duration than the second repetition.

Figure 23:
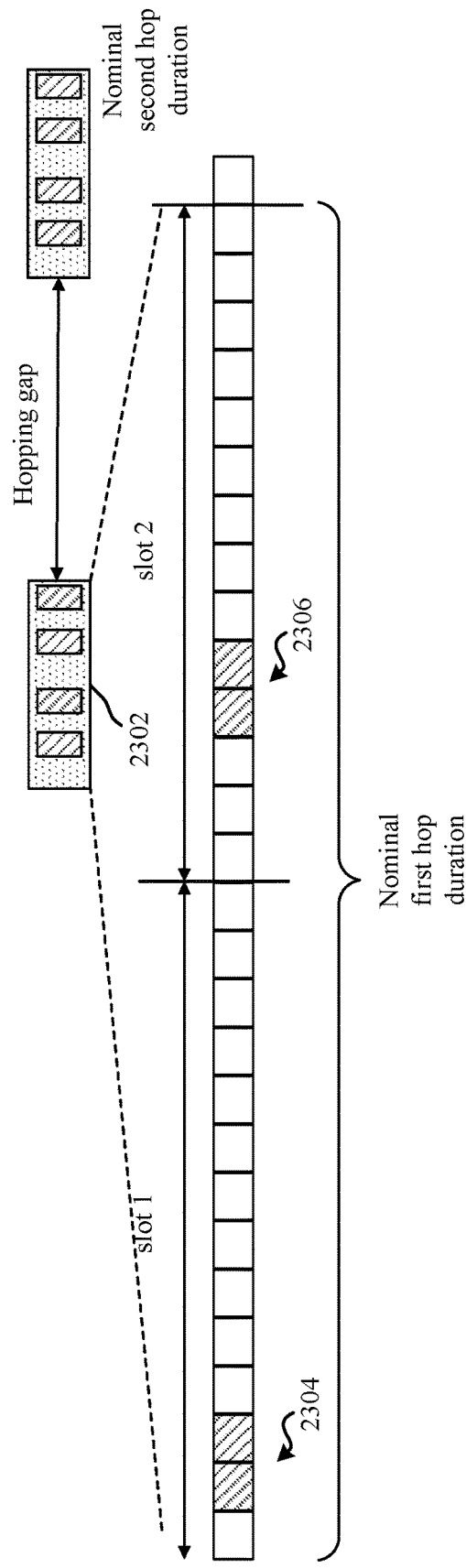
FIG. 23 illustrates an example of a timeline for transmitting multiple repetition patterns of physical uplink control channel (PUCCH) including different symbols in a collection of multiple slots, in accordance with aspects described herein.

FIG. 23 illustrates an example of a timeline 2300 for transmitting multiple repetition patterns of PUCCH including different symbols in a collection of multiple slots. In timeline 2300, a first repetition pattern 2302 includes multiple symbols 2304 of a first slot, and multiple symbols 2306 of a second slot, where the slot offset of the symbols 2304 and 2306 within their respective slots can be different. A second repetition pattern may further use symbols having different slot offsets than symbols 2304 and 2306 to provide time diversity.

In method 1900, at Block 1904, the transmission can be transmitted in the multiple time periods based on the time hopping pattern. In an aspect, UE communicating component 242, e.g., in conjunction with processor(s) 212, memory 216, transceiver 202, etc., can transmit the transmission in the multiple time periods based on the time hopping pattern. For example, UE communicating component 242 can transmit the transmission in a first instance (e.g., in a first nominal hop duration) using a first repetition pattern or format, transmit the same transmission in a second instance (e.g., in a second nominal hop duration) using a second repetition pattern or format different from the first repetition pattern or format (and/or using a different beam and/or precoder), etc., as described above and further herein. As described, for example, a base station 102 or other node (e.g., SL receiving UE) can configure the UE 104 to transmit the transmissions using time hopping.

In method 2000, at Block 2002, a UE can be configured for scheduling a transmission in multiple time periods based on a time hopping pattern where the transmission is scheduled as multiple instances of the transmission for transmitting across the multiple time periods using a different format for each time period of the multiple time periods. In an aspect, configuring component 352, e.g., in conjunction with processor(s) 312, memory 316, transceiver 302, BS communicating component 342, etc., can configure the UE (e.g., UE 104) for scheduling the transmission in multiple time periods based on the time hopping pattern where the transmission is scheduled as multiple instances of the transmission for transmitting across the multiple time periods using a different format for each time period of the multiple time periods, as described above. In one example, configuring component 352 can configure the UE with information on repetition patterns, or other time varying parameters, to use for each instance of transmitting the transmission or other parameters related to determining the repetition patterns, etc.

In method 2000, at Block 2004, the transmission can be received in the multiple time periods based on the time hopping pattern. In an aspect, BS communicating component 342, e.g., in conjunction with processor(s) 312, memory 316, transceiver 302, etc., can receive the transmission in the multiple time periods based on the time hopping pattern. For example, BS communicating component 342 can also time hop its receiver resources to receive the transmission according to a first repetition pattern in a first time period, a second repetition pattern in a second time period, etc.

In method 1900, optionally at Block 1906, one or more of a starting symbol position, a duration, or multiple transmissions for each repetition pattern can be determined. In an aspect, scheduling component 252, e.g., in conjunction with processor(s) 212, memory 216, transceiver 202, UE communicating component 242, etc., can determine one or more of a starting symbol position, a duration, or multiple transmissions for each repetition pattern. For example, scheduling component 252 can determine such parameters based on parameter values hardcoded in a memory 216 of the UE 104 (e.g., based on a wireless communication technology standard). In another example, scheduling component 252 can receive an indication of the parameter values in a configuration (e.g., from the base station 102, SL UE, etc.). In another example, scheduling component 252 can determine the parameter values based on other parameters, which UE 104 may report to the base station 102. In any case, scheduling component 252 can schedule the transmission using different repetition patterns over time based on the parameter values. As described in various examples above, the multiple transmissions can each include a collection of one or more symbols and/or one or more transmission parts.

In method 2000, optionally at Block 2006, one or more of a starting symbol position, a duration, or multiple transmissions for each repetition pattern can be determined. In an aspect, configuring component 352, e.g., in conjunction with processor(s) 312, memory 316, transceiver 302, BS communicating component 342, etc., can determine one or more of a starting symbol position, a duration, or multiple transmissions for each repetition pattern. For example, configuring component 352 can determine such parameters based on parameter values hardcoded in a memory 316 of the BS 102 (e.g., based on a wireless communication technology standard). In another example, configuring component 352 can transmit an indication of the parameter values in a configuration (e.g., to the UE 104). In another example, scheduling component 252 can determine the parameter values based on a UE capability, which UE 104 may report to the base station 102. In any case, BS communicating component 342 can receive the transmission using different repetition patterns over time based on the parameter values.

For example, the number of PUCCH transmissions in each time hop can be based on the format or configurable via indication by base station 102. In addition, a length of each time hop can be specified as the nominal hop duration, e.g., as shown and described in FIG. 22. In addition, in one example, the PUCCH transmissions in each nominal hop duration can be randomized locations, as shown and described in FIG. 23, namely in one or more slots (contiguous or non-contiguous), one or more symbols in each slot (contiguous or non-contiguous symbols), etc. Further, in an example, these symbols and slot positions may be configured by the base station 102 based cell identifier, randomly per UE, to randomize inter-cell interference, etc. For example, and as partially shown in FIG. 23, a UE can have a two hop, eight symbol PUCCH as follows—for the first hop, symbol 1, 2 in slot 1, symbol 3, 4 in slot 2, and for the second hop, symbol 1, 2 in slot 31 and symbol 3, 4 in slot 32. In addition, as shown in FIG. 23, each slot can have 14 symbols, and a first hop of PUCCH can include the first two slots.

In method 1900, optionally at Block 1908, a gap between repetition patterns in the time hopping pattern can be determined. In an aspect, scheduling component 252, e.g., in conjunction with processor(s) 212, memory 216, transceiver 202, UE communicating component 242, etc., can determine the gap between repetition patterns in the time hopping pattern. For example, scheduling component 252 can determine the gap based on a gap hardcoded in a memory 216 of the UE 104 (e.g., based on a wireless communication technology standard). In another example, scheduling component 252 can receive an indication of the gap in a configuration (e.g., from the base station 102, SL UE, etc.). In another example, scheduling component 252 can determine the gap based on a UE capability, which UE 104 may report to the base station 102. For example, the gap can be based on a channel coherence interval. In any case, scheduling component 252 can schedule the transmissions using the different repetition patterns and based on the gap between patterns.

In method 2000, optionally at Block 2008, a gap between repetition patterns in the time hopping pattern can be determined. In an aspect, configuring component 352, e.g., in conjunction with processor(s) 312, memory 316, transceiver 302, BS communicating component 342, etc., can determine the gap between repetition patterns in the time hopping pattern. For example, configuring component 352 can determine the gap based on a gap hardcoded in a memory 316 of the BS 102 (e.g., based on a wireless communication technology standard). In another example, configuring component 352 can transmit an indication of the gap in a configuration (e.g., to the UE 104). In another example, scheduling component 252 can determine the gap based on a UE capability, which UE 104 may report to the base station 102. For example, the gap can be based on a channel coherence interval. In any case, BS communicating component 342 can receive the transmissions using the different repetition patterns and based on the gap between patterns.

In method 1900, optionally at Block 1910, a configuration indicating one or more parameters regarding the time hopping pattern can be received. In an aspect, scheduling component 252, e.g., in conjunction with processor(s) 212, memory 216, transceiver 202, UE communicating component 242, etc., can receive a configuration indicating one or more parameters regarding the time hopping pattern. For example, the configuration can include one or more configurations that may be received (e.g., from the base station 102) in RRC signaling, MAC-CE, DCI signaling, etc., retrieved from memory 216, etc. For example, as described, one or more configurations can include one or more parameters indicating, or related to determining, repetition patterns or formats to use, nominal hop duration, hopping gap, number of transmissions in a hop, etc. Scheduling component 252 can schedule the transmissions in the multiple time periods using the different repetition patterns based on the configuration.

In method 2000, optionally at Block 2010, a configuration indicating one or more parameters regarding the time hopping pattern can be transmitted. In an aspect, configuring component 352, e.g., in conjunction with processor(s) 312, memory 316, transceiver 302, BS communicating component 342, etc., can transmit a configuration indicating one or more parameters regarding the time hopping pattern. For example, the configuration can include one or more configurations that may be transmitted (to the UE 104) in RRC signaling, MAC-CE, DCI signaling, etc. For example, as described, one or more configurations can include one or more parameters indicating, or related to determining, repetition patterns or formats to use, nominal hop duration, hopping gap, number of transmissions in a hop, etc. BS communicating component 342 can receive the transmissions in the multiple time periods using the different repetition patterns based on the configuration.

In method 1900, optionally at Block 1912, a configuration indicating one or more parameters regarding the time hopping pattern can be transmitted. In an aspect, scheduling component 252, e.g., in conjunction with processor(s) 212, memory 216, transceiver 202, UE communicating component 242, etc., can transmit a configuration indicating one or more parameters regarding the time hopping pattern. For example, scheduling component 252 can transmit the configuration including parameters determined by the scheduling component 252 for transmitting the transmissions based on multiple repetition patterns, which can include one or more of the parameters described above, or can include a UE capability to support certain features of time hopping, such as nominal hop duration, hopping gap, number of transmissions in a hop, channel coherence interval, etc. For example, the configuration can indicate a time hopping gap between time hops that is greater than or equal to a channel coherence time of a channel over which the multiple instance of the transmission are transmitted (which may be may be estimated by the base station 102 based on past channel measurements by the UE 104 or the base station 102). In one example, scheduling component 252 can transmit the configuration to a receiving node using RRC signaling, or other uplink signaling. The receiving node may use this configuration to determine additional configuration parameters, which may be transmitted back to the UE 104, in one example.

In method 2000, optionally at Block 2012, a configuration indicating one or more parameters regarding the time hopping pattern can be received. In an aspect, configuring component 352, e.g., in conjunction with processor(s) 312, memory 316, transceiver 302, BS communicating component 342, etc., can receive a configuration indicating one or more parameters regarding the time hopping pattern. For example, configuring component 352 can receive the configuration including parameters determined by the UE 104 for transmitting the transmissions based on multiple repetition patterns, which can include one or more of the parameters described above, or can include a UE capability to support certain features of time hopping, such as nominal hop duration, hopping gap, number of transmissions in a hop, channel coherence interval, etc. In one example, configuring component 352 can receive the configuration from the UE 104 using RRC signaling, or other uplink signaling. Configuring component 352 may use this configuration to determine additional configuration parameters, which may be transmitted back to the UE 104, in one example.

In this regard, in an example, the hopping parameters (e.g., nominal hop duration, hopping gap, number of transmissions in a hop, etc.), which can be retrieved by, or received at, or indicated by, the UE 104 (or transmitted by or received by the base station 102), as described above, can be specific to the PUCCH format allocated to the UE. For example, longer formats with more repetition may enable more time hopping whereas shorter formats without repetition may not use time hopping. In another example, parameters can be waveform specific (e.g., different for single carrier and DFT-s-OFDM waveforms). Thus, scheduling component 252 and/or configuring component 352 can apply the hopping parameters based on a selected waveform for the transmission. Also, for example, multiple sets of parameters can be communicated to the UE (e.g., in RRC signaling) and one or more chosen or activated via MAC-CE. In any case, UE 104 and base station 102 can communicate one or more configurations to establish the time hopping for PUCCH, as described above.

In an example, as described, parameters of PUCCH time hopping can be indicated as part of the PUCCH Resource Configuration in RRC/DCI/MAC-CE. In addition, for example, the UE 104 and/or base station 102 can transmit or receive configurations, as described above, including the PUCCH configuration parameters (e.g., other parameters apart from time hopping parameters). The PUCCH configuration parameters can be indicated as the same for all time hops, or can be independently configured for each time hop (e.g., by the base station 102) to adapt to the channel. For example, a base station 102 may configure, for the UE 104 (or otherwise adapt) the power of PUCCH transmission, coding rate, number of reference samples, sequence/sequence-root/cyclic-shifts, etc. used to indicate the information in each hop. In this example, scheduling component 252 can receive the PUCCH configuration parameters, determine the parameters for a given time hop, and transmit the transmission based on the parameters.

In another example, PUCCH time hopping parameters can be applicable to a whole cell or specific UE. Also these parameters may be reused until changed by gNB (e.g., via DCI or MAC-CE) or indicated for each transmission or a combination of these (for some formats indicated while for others use existing parameters).

Moreover, in accordance with aspects described above, base station 102 can indicate, and/or UE 104 can use, time hopping as well as beam hopping, time hopping as well as beam hopping and precoder hopping, etc. For example, base station 102 can indicate, and/or UE 104 can use: (1) on each time hop, a different beam (or different precoder or both); (2) more frequent time hops than beam and precoder hops (e.g., multiple time hops inside a beam/precoder hop); (3) multiple beam/precoder hops inside a time hop; etc. In these and other examples described above, whenever a channel changes either due to hopping beyond coherence time, or due to beam change or precoder change, PUCCH in that hop can carry its own DMRS to allow channel estimation, and thus UE communication component 242 can transmit, and/or BS communicating component 342 can receive, the DMRS for a given PUCCH, as described. In this regard, for example, one PUCCH bit can see many channel realizations and can be combined at the receiver to achieve diversity benefit and mitigate interference. The various types of hopping described herein can be applied together depending on which is suited in which scenario such as fast/slow fading channel, rich/sparse scattering, angular spread over which user can receive beams, etc.

Figure 24:
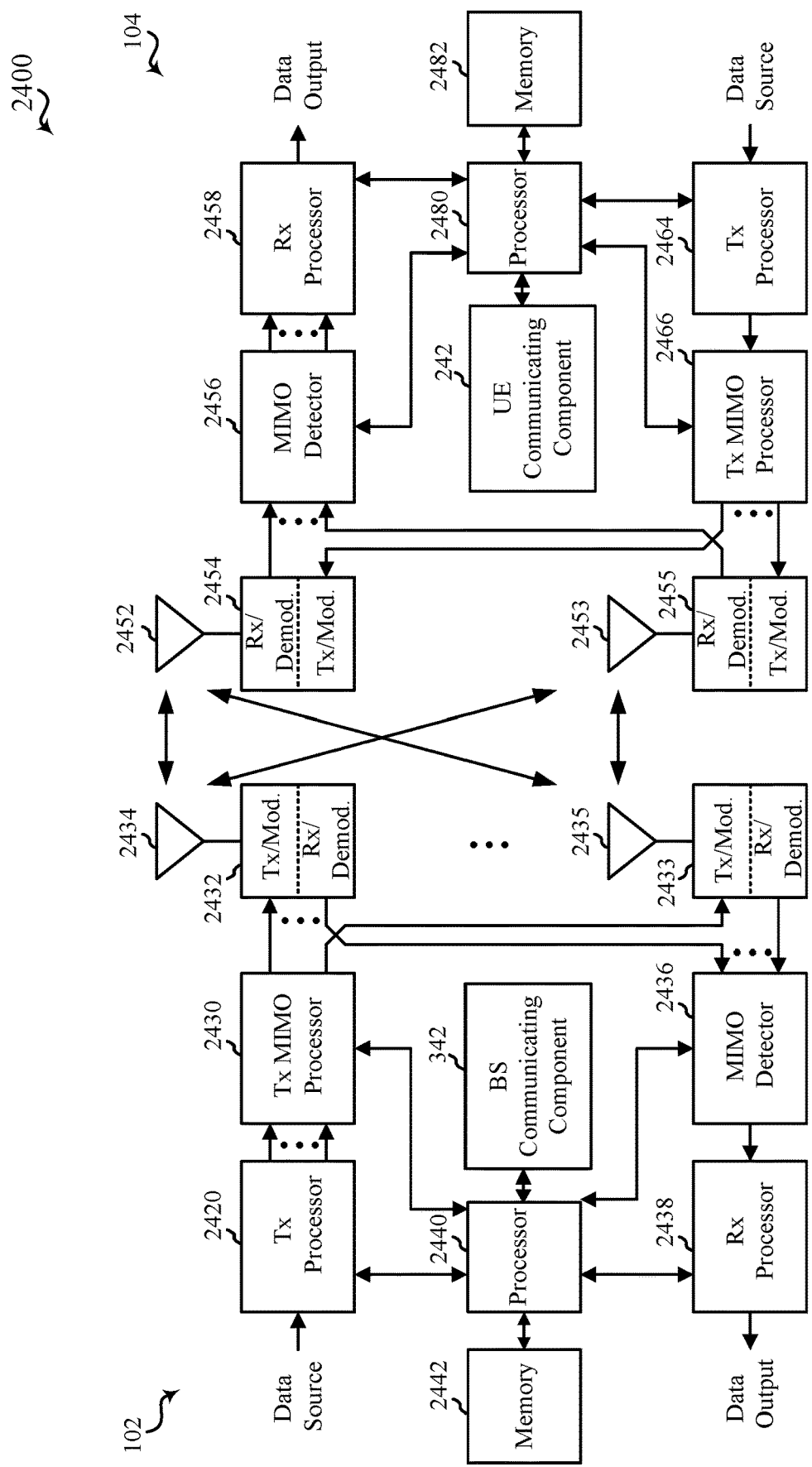
FIG. 24 is a block diagram illustrating an example of a multiple-input multiple-output (MIMO) communication system including a base station and a UE, in accordance with various aspects of the present disclosure.

FIG. 24 is a block diagram of a MIMO communication system 2400 including a base station 102 and a UE 104. The MIMO communication system 2400 may illustrate aspects of the wireless communication access network 100 described with reference to FIG. 1. The base station 102 may be an example of aspects of the base station 102 described with reference to FIG. 1. The base station 102 may be equipped with antennas 2434 and 2435, and the UE 104 may be equipped with antennas 2452 and 2453. In the MIMO communication system 2400, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 2420 may receive data from a data source. The transmit processor 2420 may process the data. The transmit processor 2420 may also generate control symbols or reference symbols. A transmit MIMO processor 2430 may perform spatial processing (e.g., precoding) on data symbols, control symbols, or reference symbols, if applicable, and may provide output symbol streams to the transmit modulator/demodulators 2432 and 2433. Each modulator/demodulator 2432 through 2433 may process a respective output symbol stream (e.g., for OFDM, etc.) to obtain an output sample stream. Each modulator/demodulator 2432 through 2433 may further process (e.g., convert to analog, amplify, filter, and upconvert) the output sample stream to obtain a DL signal. In one example, DL signals from modulator/demodulators 2432 and 2433 may be transmitted via the antennas 2434 and 2435, respectively.

The UE 104 may be an example of aspects of the UEs 104 described with reference to FIGS. 1-2. At the UE 104, the UE antennas 2452 and 2453 may receive the DL signals from the base station 102 and may provide the received signals to the modulator/demodulators 2454 and 2455, respectively. Each modulator/demodulator 2454 through 2455 may condition (e.g., filter, amplify, downconvert, and digitize) a respective received signal to obtain input samples. Each modulator/demodulator 2454 through 2455 may further process the input samples (e.g., for OFDM, etc.) to obtain received symbols. A MIMO detector 2456 may obtain received symbols from the modulator/demodulators 2454 and 2455, perform MIMO detection on the received symbols, if applicable, and provide detected symbols. A receive (Rx) processor 2458 may process (e.g., demodulate, deinterleave, and decode) the detected symbols, providing decoded data for the UE 104 to a data output, and provide decoded control information to a processor 2480, or memory 2482.

The processor 2480 may in some cases execute stored instructions to instantiate a UE communicating component 242 (see e.g., FIGS. 1 and 2).

On the uplink (UL), at the UE 104, a transmit processor 2464 may receive and process data from a data source. The transmit processor 2464 may also generate reference symbols for a reference signal. The symbols from the transmit processor 2464 may be precoded by a transmit MIMO processor 2466 if applicable, further processed by the modulator/demodulators 2454 and 2455 (e.g., for SC-FDMA, etc.), and be transmitted to the base station 102 in accordance with the communication parameters received from the base station 102. At the base station 102, the UL signals from the UE 104 may be received by the antennas 2434 and 2435, processed by the modulator/demodulators 2432 and 2433, detected by a MIMO detector 2436 if applicable, and further processed by a receive processor 2438. The receive processor 2438 may provide decoded data to a data output and to the processor 2440 or memory 2442.

The processor 2440 may in some cases execute stored instructions to instantiate a BS communicating component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 2400. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 2400.

The following aspects are illustrative only and aspects thereof may be combined with aspects of other embodiments or teaching described herein, without limitation.

Aspect 1 is a method for wireless communication at a UE including scheduling multiple transmissions in multiple time periods based on a beam hopping pattern, where the beam hopping pattern includes at least one of at least one transmission of the multiple transmissions is scheduled as including at least one transmission part and across the multiple time periods using a different beam for each of the multiple transmissions, or at least two transmissions of the multiple transmissions scheduled with a beam switching gap between the at least two transmissions that is less than a symbol in duration, and transmitting the multiple transmissions in the multiple time periods based on the beam hopping pattern.

In Aspect 2, the method of Aspect 1 includes where the at least one transmission part is less than a symbol in duration.

In Aspect 3, the method of any of Aspects 1 or 2 includes determining a length of each of the multiple transmission based on a waveform type for the transmission.

In Aspect 4, the method of any of Aspects 1 to 3 includes receiving a configuration indicating a number of the transmission parts per beam hop or the number of symbols and transmission parts per beam hop, where scheduling the transmission is based on the configuration.

In Aspect 5, the method of any of Aspects 1 to 4 includes where the multiple transmissions do not cross a symbol boundary in time.

In Aspect 6, the method of Aspect 5 includes where the beam hopping pattern includes the at least one transmission part, where the multiple transmissions are each a symbol in duration, and where a beam switching gap for switching beams among the multiple transmission parts is a symbol in duration.

In Aspect 7, the method of any of Aspects 5 or 6 includes where the beam hopping pattern includes the at least one transmission part, where the at least one transmission part is a first duration that is less than a symbol in duration, and where a beam switching gap for switching beams among the multiple transmission parts is a second duration, where a sum of the first duration of the at least one transmission part and the second duration are a symbol in duration.

In Aspect 8, the method of any of Aspects 1 to 7 includes where the beam hopping pattern includes the at least one transmission part that crosses a symbol boundary in time.

In Aspect 9, the method of any of Aspects 1 to 8 includes where the beam hopping pattern includes the at least two transmissions, where the at least two transmissions are each a symbol in duration.

In Aspect 10, the method of Aspect 9 includes including a CP at a beginning or end of at least one of the multiple transmission parts, where the CP is not adjacent to the symbol boundary.

In Aspect 11, the method of any of Aspects 1 to 10 includes where the beam hopping pattern includes the at least two transmissions each including multiple transmission parts that are each less than a symbol in duration.

In Aspect 12, the method of Aspect 11 includes transmitting a demodulation reference signal for one of the multiple transmission parts that crosses a symbol boundary.

In Aspect 13, the method of any of Aspects 1 to 12 includes receiving, from the base station or a transmitting UE in sidelink communications, a configuration indicating the different beams to use in scheduling the multiple transmissions.

In Aspect 14, the method of any of Aspects 1 to 13 includes transmitting, to the base station or a transmitting UE in sidelink communications, an indication of a configuration indicating the different beams used in scheduling the multiple transmissions.

In Aspect 15, the method of any of Aspects 1 to 14 includes receiving, from the base station, a configuration indicating one or more parameters for scheduling the multiple transmissions using the different beams.

In Aspect 16, the method of Aspect 15 includes where the one or more parameters indicate a length, format, or type of a control channel, and further comprising determining, based on the length, format, or type of the control channel, at least one of a number of symbols or transmission parts per beam hop.

In Aspect 17, the method of any of Aspects 15 or 16 includes where the one or more parameters indicate a length of a beam switching gap for switching beams among the multiple transmissions.

In Aspect 18, the method of any of Aspects 15 to 17 includes where the one or more parameters indicate the different beams to use in scheduling the multiple transmissions by specifying, for each beam of the different beams, one or more of a quasi-colocation source or an index into a table of configured beams.

Aspect 19 is a method for wireless communication at a UE including scheduling a transmission in multiple time periods based on a hopping pattern, where the hopping pattern includes at least one of a precoder hopping pattern where the transmission is scheduled as multiple instances of the transmission for transmission across the multiple time periods using a different transmit or receive precoder over one or more transmission ports for each time period of the multiple time periods, or a time hopping pattern where the transmission is scheduled as multiple instances of the transmission for transmitting across the multiple time periods using different formats for each time period of the multiple time periods, and transmitting the transmission in the multiple time periods based on the hopping pattern.

Aspect 20, the method of Aspect 19 includes where the hopping pattern includes the precoder hopping pattern, and further comprising receiving, from the base station, a configuration indicating the different precoders to use in transmitting each of the multiple instances of the transmission.

In Aspect 21, the method of Aspect 20 includes where the configuration indicates each of the different precoders as a spatial relationship to a different precoded transmission received, or transmitted, by the UE.

In Aspect 22, the method of any of Aspects 19 to 21 includes where the hopping pattern includes the precoder hopping pattern, and further comprising transmitting, to the base station, an indication of the different precoders used in transmitting each of the multiple instances of the transmission.

In Aspect 23, the method of any of Aspects 19 to 22 includes where the hopping pattern includes the precoder hopping pattern, and further comprising receiving, from the base station, a configuration indicating one or more parameters for transmitting the multiple instances of the transmission using the different precoders.

In Aspect 24, the method of Aspect 23 includes where the one or more parameters indicate at least one of a number of symbols or transmission parts per precoder hop.

In Aspect 25, the method of any of Aspects 23 or 24 includes where the one or more parameters indicate a length, format, or type of a control channel, and further comprising determining, based on the length, format, or type of the control channel, at least one of a number of symbols or transmission parts per precoder hop.

In Aspect 27, the method of any of Aspects 23 to 25 includes where the one or more parameters relate to DMRS samples per precoder hop, and further comprising transmitting, based on the configuration, one or more DMRS samples per precoder hop along with the multiple instances of the transmission.

In Aspect 28, the method of any of Aspects 23 to 27 includes where the one or more parameters indicate the different precoders for a multi-layer transmission, and where transmitting the transmission includes transmitting the multi-layer transmission using the different precoders by using a different one of the different precoders for each layer and hopping among the different precoders for each layer.

In Aspect 29, the method of any of Aspects 19 to 28 includes where the hopping pattern includes a beam hopping pattern and the precoder hopping pattern, and where transmitting the transmission includes transmitting the multiple instances using different precoders, and transmitting multiple transmissions of at least one of the multiple instances using different beams.

In Aspect 30, the method of any of Aspects 19 to 29 includes where the hopping pattern includes a beam hopping pattern, and where transmitting the transmission includes transmitting a multi-port transmission using one of the different beams for each for each of multiple port transmissions.

In Aspect 31, the method of any of Aspects 19 to 30 includes where the hopping pattern includes the time hopping pattern, where the multiple time periods include multiple slots, and where the multiple slots are separated in time by a gap of one or more slots.

In Aspect 32, the method of Aspect 31 includes where the different formats include different starting symbol positions within two or more of the multiple slots for the multiple instances of the transmission.

In Aspect 33, the method of any of Aspects 19 to 32 includes where the hopping pattern includes the time hopping pattern, and where two or more of the different formats include multiple transmission parts or symbols.

In Aspect 34, the method of Aspect 33 includes where a number of the multiple transmission parts or symbols is based on a format of an uplink channel corresponding to the transmission.

In Aspect 35, the method of any of Aspects 33 or 34 includes receiving, from the base station, a configuration indicating a number of the multiple transmission parts or symbols in each of the different formats.

In Aspect 36, the method of any of Aspects 19 to 35 includes where the hopping pattern includes the time hopping pattern, and where each of the different formats is of a length specified as a fixed nominal time hop duration.

In Aspect 37, the method of Aspect 36 includes receiving, from the base station, a configuration indicating one or more parameters for determining, for a given format of the different formats, a location of the multiple transmission parts or symbols within one or more slots.

In Aspect 38, the method of any of Aspects 19 to 37 includes where the hopping pattern includes the time hopping pattern, and further comprising receiving, from the base station, a configuration indicating one or more parameters for transmitting the multiple instances of the transmission using the different formats.

In Aspect 39, the method of Aspect 38 includes where the one or more parameters indicate a duration of the different formats, a time gap for hopping between the different formats, or a number of multiple transmission parts or symbols in each of the different formats, where the time gap is greater than or equal to a coherence time of a channel over which the multiple instance of the transmission are transmitted.

In Aspect 40, the method of Aspect 39 includes where the one or more parameters correspond to each of one or more formats of an uplink channel over which the transmission is transmitted.

In Aspect 41, the method of any of Aspects 39 or 40 includes where the one or more parameters correspond to a type of waveform used in transmitting the transmission.

In Aspect 42, the method of any of Aspects 39 to 41 includes where the configuration is received over one or more of RRC signaling, a MAC-CE, or in DCI.

In Aspect 43, the method of Aspect 42 includes where the one or more parameters include one or more of a transmission power, a coding rate, a number of reference samples, a sequence, a sequence root, or a cyclic shift of the uplink channel transmission, and where the one or more parameters have different values for different ones of the different formats.

In Aspect 44, the method of any of Aspects 19 to 43 includes where the hopping pattern includes a beam hopping pattern, the precoder hopping pattern, and the time hopping pattern, and where transmitting the transmission includes transmitting the multiple instances using different precoders, and transmitting multiple transmissions of at least one of the multiple instances using different beams, for each of the different formats.

In Aspect 45, the method of any of Aspects 19 to 44 includes where the hopping pattern includes a beam hopping pattern, the precoder hopping pattern, and the time hopping pattern, and where transmitting the transmission includes transmitting the multiple instances using different formats for each of different precoders, and transmitting multiple transmissions of at least one of the multiple instances using different beams.

Aspect 46 is a method for wireless communication at a network including configuring a UE for scheduling multiple transmissions in multiple time periods based on a beam hopping pattern, where the beam hopping pattern includes at least one of at least one transmission of the multiple transmissions is scheduled as including at least one transmission part and across the multiple time periods using a different beam for each transmissions, or at least two transmissions of the multiple transmissions scheduled with a beam switching gap between the at least two transmissions that is less than a symbol in duration, and receiving the multiple transmissions in the multiple time periods based on the hopping pattern.

In Aspect 47, the method of Aspect 46 includes where the at least one transmission part is less than a symbol in duration.

In Aspect 48, the method of any of Aspects 46 or 47 includes determining a length of each of the multiple transmissions based on a waveform type for the transmission.

In Aspect 49, the method of any of Aspects 46 to 48 includes transmitting, to the UE, a configuration indicating a number of the multiple transmission parts per beam hop or the number of symbols and transmission parts per beam hop, where scheduling the transmission is based on the configuration.

In Aspect 50, the method of any of Aspects 46 to 49 includes where the multiple transmissions do not cross a symbol boundary in time.

In Aspect 51, the method of Aspect 50 includes where the beam hopping pattern includes the at least one transmission part, where the multiple transmissions are each a symbol in duration, and where a beam switching gap for switching beams among the multiple transmission parts is a symbol in duration.

In Aspect 52, the method of any of Aspects 50 or 51 includes where the beam hopping pattern includes the at least one transmission part, where the at least one transmission part is a first duration that is less than a symbol in duration, and where a beam switching gap for switching beams among the multiple transmission parts is a second duration, where a sum of the first duration of the at least one transmission part and the second duration are a symbol in duration.

In Aspect 53, the method of any of Aspects 46 to 52 includes where the beam hopping pattern includes the at least one transmission part that crosses a symbol boundary in time.

In Aspect 54, the method of any of Aspects 46 to 53 includes where the beam hopping pattern includes the at least two transmissions, where the at least two transmissions are each a symbol in duration.

In Aspect 55, the method of Aspect 54 includes where the transmission includes a CP at a beginning or end of at least one of the multiple transmission parts, where the CP is not adjacent to the symbol boundary.

In Aspect 56, the method of any of Aspects 46 to 55 includes where the beam hopping pattern includes the at least two transmissions each including multiple transmission parts that are each less than a symbol in duration.

In Aspect 57, the method of Aspect 56 includes receiving a demodulation reference signal for one of the multiple transmission parts that crosses a symbol boundary.

In Aspect 58, the method of any of Aspects 46 to 57 includes transmitting, to the UE, a configuration indicating the different beams to use in scheduling the multiple transmissions.

In Aspect 59, the method of any of Aspects 46 to 58 includes receiving, from the UE, an indication of a configuration indicating the different beams used in scheduling the multiple transmissions.

In Aspect 60, the method of any of Aspects 46 to 59 includes transmitting, to the UE, a configuration indicating one or more parameters for scheduling the multiple transmissions using the different beams.

In Aspect 61, the method of Aspect 60 includes where the one or more parameters indicate a length, format, or type of a control channel, and further comprising determining, based on the length, format, or type of the control channel, at least one of a number of the multiple transmissions per beam hop.

In Aspect 62, the method of any of Aspects 60 or 61 includes where the one or more parameters indicate a length of a beam switching gap for switching beams among the multiple transmissions.

In Aspect 63, the method of any of Aspects 60 to 62 includes where the one or more parameters indicate the different beams to use in scheduling the multiple transmissions by specifying, for each beam of the different beams, one or more of a quasi-colocation source or an index into a table of configured beams.

Aspect 64 is a method for wireless communication at a network including configuring a UE for scheduling a transmission in multiple time periods based on a hopping pattern, where the hopping pattern includes at least one of a precoder hopping pattern where the transmission is scheduled as multiple instances of the transmission for transmission across the multiple time periods using a different transmit or receive precoder over one or more transmission ports for each time period of the multiple time periods, or a time hopping pattern where the transmission is scheduled as multiple instances of the transmission for transmitting across the multiple time periods using different formats for each time period of the multiple time periods, and receiving the transmission in the multiple time periods based on the hopping pattern.

In Aspect 65, the method of Aspect 64 includes where the hopping pattern includes the precoder hopping pattern, and further comprising transmitting, to the UE, a configuration indicating the different precoders to use in transmitting each of the multiple instances of the transmission.

In Aspect 66, the method of Aspect 65 includes where the configuration indicates each of the different precoders as a spatial relationship to a different precoded transmission received, or transmitted, by the UE.

In Aspect 67, the method of any of Aspects 64 to 66 includes where the hopping pattern includes the precoder hopping pattern, and further comprising receiving, from the UE, an indication of the different precoders used in transmitting each of the multiple instances of the transmission.

In Aspect 68, the method of any of Aspects 64 to 67 includes where the hopping pattern includes the precoder hopping pattern, and further comprising transmitting, to the UE, a configuration indicating one or more parameters for transmitting the multiple instances of the transmission using the different precoders.

In Aspect 69, the method of Aspect 68 includes where the one or more parameters indicate at least one of a number of symbols or transmission parts per precoder hop.

In Aspect 70, the method of any of Aspects 68 or 69 includes where the one or more parameters indicate a length, format, or type of a control channel, and further comprising determining, based on the length, format, or type of the control channel, at least one of a number of symbols or transmission parts per precoder hop.

In Aspect 71, the method of any of Aspects 68 to 70 includes where the one or more parameters relate to DMRS samples per precoder hop, and further comprising receiving, based on the configuration, one or more DMRS samples per precoder hop along with the multiple instances of the transmission.

In Aspect 72, the method of any of Aspects 68 to 71 includes where the one or more parameters indicate the different precoders for a multi-layer transmission, and where receiving the transmission includes receiving the multi-layer transmission using the different precoders having a different one of the different precoders for each layer and hopping among the different precoders for each layer.

In Aspect 73, the method of any of Aspects 64 to 72 includes where the hopping pattern includes the beam hopping pattern and the precoder hopping pattern, and where receiving the transmission includes receiving the multiple instances using different precoders, and receiving multiple transmissions of at least one of the multiple instances using different beams.

In Aspect 74, the method of any of Aspects 64 to 73 includes where the hopping pattern includes the beam hopping pattern, and where receiving the transmission includes receiving a multi-port transmission using one of the different beams for each for each of multiple port transmissions.

In Aspect 75, the method of any of Aspects 64 to 74 includes where the hopping pattern includes the time hopping pattern, where the multiple time periods include multiple slots, and where the multiple slots are separated in time by a gap of one or more slots.

In Aspect 76, the method of any of Aspects 64 to 75 includes where the different formats include different starting symbol positions within two or more of the multiple slots for the multiple instances of the transmission.

In Aspect 77, the method of any of Aspects 64 to 76 includes where the hopping pattern includes the time hopping pattern, and where two or more of the different formats include multiple transmission parts or symbols.

In Aspect 78, the method of Aspect 77 includes where a number of the multiple transmission parts or symbols is based on a format of an uplink channel corresponding to the transmission.

In Aspect 79, the method of any of Aspects 77 or 78 includes transmitting, to the UE, a configuration indicating a number of the multiple transmission parts or symbols in each of the different formats.

In Aspect 80, the method of any of Aspects 64 to 79 includes where the hopping pattern includes the time hopping pattern, and where each of the different formats is of a length specified as a fixed nominal time hop duration.

In Aspect 81, the method of Aspect 80 includes transmitting, to the UE, a configuration indicating one or more parameters for determining, for a given format of the different formats, a location of the multiple transmission parts or symbols within one or more slots.

In Aspect 82, the method of any of Aspects 64 to 81 includes where the hopping pattern includes the time hopping pattern, and further comprising transmitting, to the UE, a configuration indicating one or more parameters for transmitting the multiple instances of the transmission using the different formats.

In Aspect 83, the method of Aspect 82 includes where the one or more parameters indicate a duration of the different formats, a time gap for hopping between the different formats, or a number of multiple transmission parts or symbols in each of the different formats, where the time gap is greater than or equal to a coherence time of a channel over which the multiple instance of the transmission are transmitted.

In Aspect 84, the method of Aspect 83 includes where the one or more parameters correspond to each of one or more formats of an uplink channel over which the transmission is transmitted.

In Aspect 85, the method of any of Aspects 83 or 84 includes where the one or more parameters correspond to a type of waveform used in transmitting the transmission.

In Aspect 86, the method of any of Aspects 83 or 85 includes where the configuration is transmitted over one or more of RRC signaling, a MAC-CE, or in DCI.

In Aspect 87, the method of Aspect 86 includes where the one or more parameters include one or more of a transmission power, a coding rate, a number of reference samples, a sequence, a sequence root, or a cyclic shift of the uplink channel transmission, and where the one or more parameters have different values for different ones of the different formats.

In Aspect 88, the method of any of Aspects 64 to 87 includes where the hopping pattern includes a beam hopping pattern, the precoder hopping pattern, and the time hopping pattern, and where receiving the transmission includes receiving the multiple instances using different precoders, and receiving multiple transmissions of at least one of the multiple instances using different beams, for each of the different formats.

In Aspect 89, the method of any of Aspects 64 to 88 includes where the hopping pattern includes the beam hopping pattern, the precoder hopping pattern, and the time hopping pattern, and where receiving the transmission includes receiving the multiple instances using different formats for each of different precoders, and receiving multiple transmissions of at least one of the multiple instances using different beams.

Aspect 90 is an apparatus for wireless communication including a transceiver, a memory configured to store instructions, and one or more processors communicatively coupled with the memory and the transceiver, where the one or more processors are configured to execute the instructions to cause the apparatus to perform any of the methods of Aspects 1 to 89.

Aspect 91 is an apparatus for wireless communication including means for performing any of the methods of Aspects 1 to 89.

Aspect 92 is a computer-readable medium including code executable by one or more processors for wireless communications, the code including code for performing any of the methods of Aspects 1 to 89.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication at a user equipment (UE), comprising:
    scheduling multiple transmissions in multiple time periods based on a beam hopping pattern, where the beam hopping pattern includes at least one of:
        at least one transmission of the multiple transmissions is scheduled as including at least one transmission part and across the multiple time periods using a different beam for each of the multiple transmissions; or
        at least two transmissions of the multiple transmissions scheduled with a beam switching gap between the at least two transmissions that is less than a symbol in duration; and transmitting the multiple transmissions in the multiple time periods based on the beam hopping pattern.

2. The method of claim 1, wherein the at least one transmission part is less than a symbol in duration.

3. The method of claim 1, further comprising determining a length of each of the multiple transmission based on a waveform type for the transmission.

4. The method of claim 1, further comprising receiving a configuration indicating a number of the transmission parts per beam hop or the number of symbols and transmission parts per beam hop, wherein scheduling the transmission is based on the configuration.

5. The method of claim 1, wherein the multiple transmissions do not cross a symbol boundary in time.

6. The method of claim 5, wherein the beam hopping pattern includes the at least one transmission part, wherein the multiple transmissions are each a symbol in duration, and wherein a beam switching gap for switching beams among the multiple transmission parts is a symbol in duration.

7. The method of claim 5, wherein the beam hopping pattern includes the at least one transmission part, wherein the at least one transmission part is a first duration that is less than a symbol in duration, and wherein a beam switching gap for switching beams among the multiple transmission parts is a second duration, where a sum of the first duration of the at least one transmission part and the second duration are a symbol in duration.

8. The method of claim 1, wherein the beam hopping pattern includes the at least one transmission part that crosses a symbol boundary in time.

9. The method of claim 1, wherein the beam hopping pattern includes the at least two transmissions, wherein the at least two transmissions are each a symbol in duration.

10. The method of claim 9, further comprising including a cyclic prefix (CP) at a beginning or end of at least one of the multiple transmission parts, wherein the CP is not adjacent to the symbol boundary.

11. The method of claim 1, wherein the beam hopping pattern includes the at least two transmissions each including multiple transmission parts that are each less than a symbol in duration.

12. The method of claim 11, further comprising transmitting a demodulation reference signal for one of the multiple transmission parts that crosses a symbol boundary.

13. A method for wireless communication at a user equipment (UE), comprising:
scheduling a transmission in multiple time periods based on a hopping pattern, wherein the hopping pattern includes at least one of:
a precoder hopping pattern where the transmission is scheduled as multiple instances of the transmission for transmission across the multiple time periods using a different transmit or receive precoder over one or more transmission ports for each time period of the multiple time periods; or
a time hopping pattern where the transmission is scheduled as multiple instances of the transmission for transmitting across the multiple time periods using different formats for each time period of the multiple time periods; and
transmitting the transmission in the multiple time periods based on the hopping pattern.

14. The method of claim 13, wherein the hopping pattern includes the precoder hopping pattern, and further comprising receiving, from the base station, a configuration indicating the different precoders to use in transmitting each of the multiple instances of the transmission.

15. The method of claim 14, wherein the configuration indicates each of the different precoders as a spatial relationship to a different precoded transmission received, or transmitted, by the UE.

16. The method of claim 13, wherein the hopping pattern includes the precoder hopping pattern, and further comprising transmitting, to the base station, an indication of the different precoders used in transmitting each of the multiple instances of the transmission.

17. The method of claim 13, wherein the hopping pattern includes the precoder hopping pattern, and further comprising receiving, from the base station, a configuration indicating one or more parameters for transmitting the multiple instances of the transmission using the different precoders.

18. The method of claim 17, wherein the one or more parameters indicate at least one of a number of symbols or transmission parts per precoder hop.

19. The method of claim 17, wherein the one or more parameters indicate a length, format, or type of a control channel, and further comprising determining, based on the length, format, or type of the control channel, at least one of a number of symbols or transmission parts per precoder hop.

20. The method of claim 17, wherein the one or more parameters relate to demodulation reference signal (DMRS) samples per precoder hop, and further comprising transmitting, based on the configuration, one or more DMRS samples per precoder hop along with the multiple instances of the transmission.

21. The method of claim 20, wherein the one or more parameters indicate the different precoders for a multi-layer transmission, and wherein transmitting the transmission includes transmitting the multi-layer transmission using the different precoders by using a different one of the different precoders for each layer and hopping among the different precoders for each layer.

22. The method of claim 13, wherein the hopping pattern includes a beam hopping pattern and the precoder hopping pattern, and wherein transmitting the transmission includes transmitting the multiple instances using different precoders, and transmitting multiple transmissions of at least one of the multiple instances using different beams.

23. The method of claim 13, wherein the hopping pattern includes a beam hopping pattern, and wherein transmitting the transmission includes transmitting a multi-port transmission using one of the different beams for each for each of multiple port transmissions.

24. The method of claim 13, wherein the hopping pattern includes the time hopping pattern, wherein the multiple time periods include multiple slots, and wherein the multiple slots are separated in time by a gap of one or more slots, and wherein the different formats include different starting symbol positions within two or more of the multiple slots for the multiple instances of the transmission.

25. The method of claim 13, wherein the hopping pattern includes the time hopping pattern, and wherein two or more of the different formats include multiple transmission parts or symbols, and wherein a number of the multiple transmission parts or symbols is based on a format of an uplink channel corresponding to the transmission.

26. The method of claim 13, wherein the hopping pattern includes the time hopping pattern, and wherein each of the different formats is of a length specified as a fixed nominal time hop duration.

27. A method for wireless communication at a network, comprising:

configuring a user equipment (UE) for scheduling multiple transmissions in multiple time periods based on a beam hopping pattern, where the beam hopping pattern includes at least one of:
- at least one transmission of the multiple transmissions is scheduled as including at least one transmission part and across the multiple time periods using a different beam for each transmissions; or
- at least two transmissions of the multiple transmissions scheduled with a beam switching gap between the at least two transmissions that is less than a symbol in duration; and receiving the multiple transmissions in the multiple time periods based on the hopping pattern.

28. The method of claim 27, wherein the at least one transmission part is less than a symbol in duration.

29. A method for wireless communication at a network, comprising:
configuring a user equipment (UE) for scheduling a transmission in multiple time periods based on a hopping pattern, where the hopping pattern includes at least one of:
- a precoder hopping pattern where the transmission is scheduled as multiple instances of the transmission for transmission across the multiple time periods using a different transmit or receive precoder over one or more transmission ports for each time period of the multiple time periods; or
- a time hopping pattern where the transmission is scheduled as multiple instances of the transmission for transmitting across the multiple time periods using different formats for each time period of the multiple time periods; and receiving the transmission in the multiple time periods based on the hopping pattern.

30. The method of claim 29, wherein the hopping pattern includes the precoder hopping pattern, and further comprising transmitting, to the UE, a configuration indicating the different precoders to use in transmitting each of the multiple instances of the transmission.

* * * * *